US010486303B2

(12) United States Patent
Westermo et al.

(10) Patent No.: US 10,486,303 B2
(45) Date of Patent: Nov. 26, 2019

(54) ELEVATED ROBOTIC ASSISTIVE DEVICE SYSTEM AND METHOD

(71) Applicants: Bruce Donald Westermo, San Diego, CA (US); Anthony Patrick Mauro, II, San Diego, CA (US)

(72) Inventors: Bruce Donald Westermo, San Diego, CA (US); Anthony Patrick Mauro, II, San Diego, CA (US)

(73) Assignee: Bruce Donald Westermo, Freeland, WA (US)

( * ) Notice: Subject to any disclaimer, the term of this patent is extended or adjusted under 35 U.S.C. 154(b) by 268 days.

(21) Appl. No.: 15/477,103

(22) Filed: Apr. 2, 2017

(65) Prior Publication Data

US 2017/0344028 A1    Nov. 30, 2017

Related U.S. Application Data

(60) Provisional application No. 62/340,846, filed on May 24, 2016.

(51) Int. Cl.
| | |
|---|---|
| *B61B 3/00* | (2006.01) |
| *B25J 5/02* | (2006.01) |
| *H04L 29/08* | (2006.01) |
| *G05D 1/02* | (2006.01) |

(52) U.S. Cl.
CPC .............. *B25J 5/02* (2013.01); *G05D 1/0212* (2013.01); *H04L 67/12* (2013.01); *H04L 67/125* (2013.01); *H04L 67/306* (2013.01); *Y10S 901/01* (2013.01)

(58) Field of Classification Search
CPC ... B61B 3/00; B61B 13/00; B61L 5/00; B61L 7/00; E01B 25/00; E01B 25/08; E01B 25/22
See application file for complete search history.

(56) References Cited

U.S. PATENT DOCUMENTS

| | | | |
|---|---|---|---|
| 4,726,732 A | 2/1988 | Kato | |
| 5,119,732 A | 6/1992 | Lisy | |
| 5,161,936 A | 11/1992 | Kato | |
| 5,419,260 A | 5/1995 | Hamilton | |
| 6,327,519 B1 | 12/2001 | Ostwald | |
| 6,722,284 B2 | 4/2004 | Gustafson | |
| 7,206,667 B2 | 4/2007 | Kleinschmitt | |
| 7,539,558 B2 | 5/2009 | Adachi | |
| 7,650,852 B2 | 1/2010 | Clifford | |
| 8,442,682 B2 | 5/2013 | Wagner | |
| 8,688,272 B2 | 4/2014 | Hong | |
| 8,977,393 B1 | 3/2015 | Kohler | |
| 9,003,919 B2 | 4/2015 | Kumagai | |

(Continued)

*Primary Examiner* — Robert J McCarry, Jr.
(74) *Attorney, Agent, or Firm* — Anthony P. Mauro, II

(57) ABSTRACT

An elevated system for providing support and control of a network of mobile robotic apparatus contains a system of tracks attached to an elevated structure with means to connect one or more adjacent tracks for the mobile robotic apparatus to traverse the track system. The mobile robotic apparatus contains one or more mobile robotic units with means to actuate and process sensor input and provide multimedia and communication signal monitoring and tracking capabilities. A remote controller not attached to the track system nor robotic apparatus provides command and control to the robotic units, and provides electronic storage of data generated by the robotic units and/or remote controller.

7 Claims, 22 Drawing Sheets

(56) References Cited

U.S. PATENT DOCUMENTS

| | | |
|---|---|---|
| 9,043,025 B2 | 5/2015 | Brooks |
| 9,129,251 B2 * | 9/2015 | Davidson ............... G06Q 10/08 |
| 9,259,842 B2 | 2/2016 | Fouillade |
| 9,429,821 B2 | 8/2016 | Cury |
| 2007/0031217 A1 | 2/2007 | Sharma |
| 2010/0222925 A1 | 9/2010 | Anezaki |
| 2012/0125221 A1 * | 5/2012 | Gustaffson .............. B61B 13/04 104/89 |

* cited by examiner

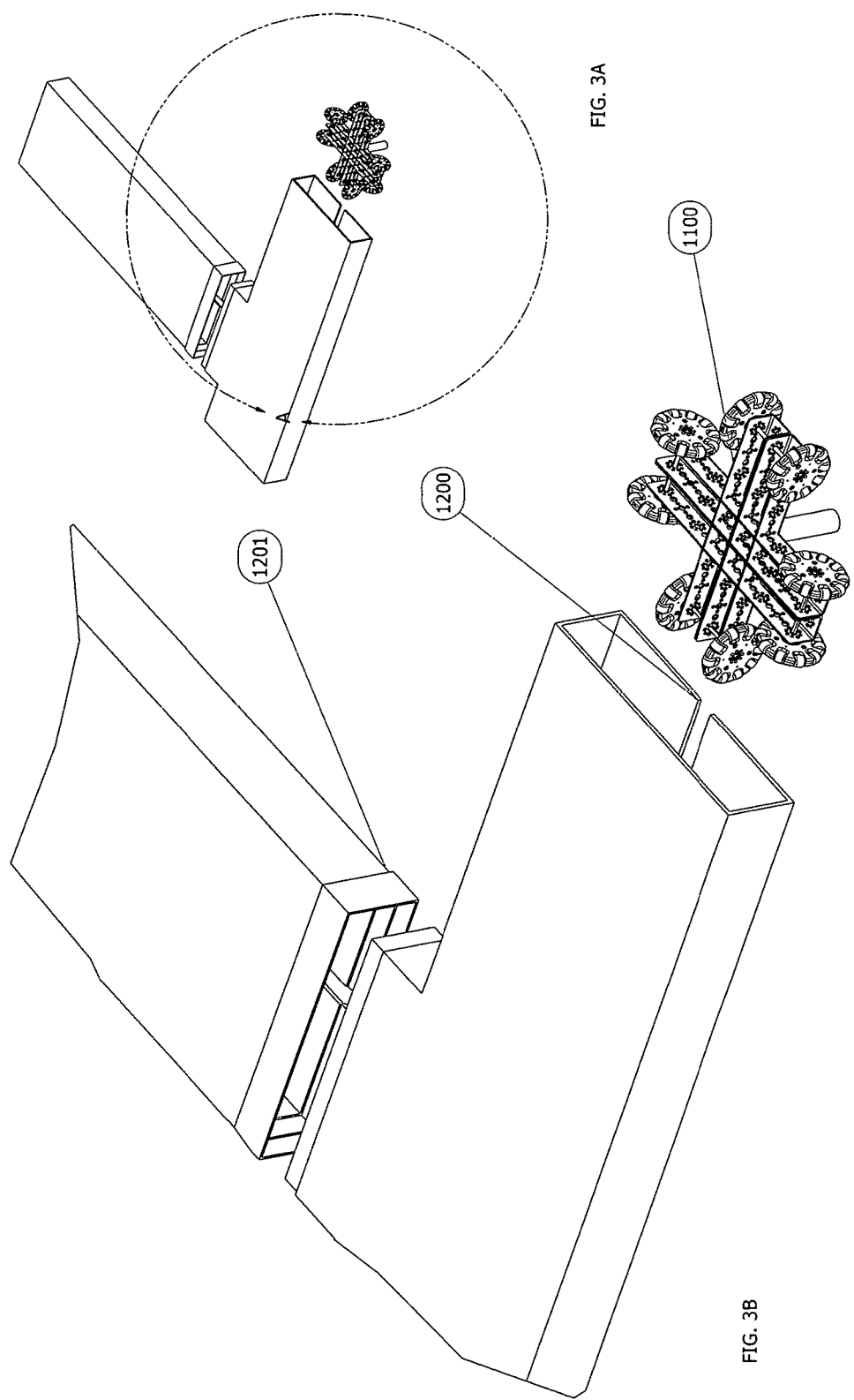

ELEVATED ROBOTIC ASSISTIVE DEVICE SYSTEM AND METHOD

CLAIM OF PRIORITY

A claim of priority is made to the following U.S. Provisional Applications No. 62/340,846 entitled "ELEVATED ASSISTIVE ROBOTIC DEVICES" filed May 24, 2016, and assigned to the assignee hereof and hereby expressly incorporated by reference herein.

TECHNICAL FIELD

Several embodiments relate to robotics systems, and in particular, an elevated robotic assistive device (ERAD).

DESCRIPTION OF RELATED ART

Since the advent of robotic systems and devices, the primary application focus has been with enhancing productivity and safety in industrial and agricultural markets such as manufacturing assembly lines (e.g. vehicles, integrated circuits and circuit boards, food preparation), warehouse package/container retrieval and disbursement, and crop harvesting to name a few. Robotic assistance devices have also been deployed in military applications employing various form factors (e.g. tanks, unmanned aerial vehicles) and various levels of artificial intelligence. The popularity of robotic assistance devices in personal and domestic markets comparably have been primarily confined to toys including flying devices (e.g. drones) and cleaning devices (e.g. carpet or pool cleaners). Consequently, these devices typically occupy space in the open air or on the ground. While floor-based mobile robots (e.g. telepresence robots) may have great potential for automating processes and assisting people (i.e. the disabled and infirmed or home/industrial security), their need to navigate around objects (people, furniture, stairs, pets.) makes them expensive while still not alleviating the potential for a sense of obtrusiveness on the part of the users. Consequently, there is more "open real estate" available overhead than on the floor for many types of personal assistant robotics. Accordingly, it would be advantageous to provide an improved system for providing personal assistive services in an elevated robotic system.

SUMMARY

Embodiments disclosed herein address the above stated needs by using an elevated robotic system and method with novel mechanical, electrical and control features.

In one embodiment, a system for providing assistance in a residential, retail, or industrial environment comprises a track system which is elevated off the ground, one or more robotic apparatus attached to the track system for providing a mobile vehicle to traverse the track system, one or more sensors attached to the robotic apparatus for providing sensor input signals to the robotic apparatus, one or more controllers attached to the robotic apparatus for providing motorized movement and processing, one or more communication apparatus attached to the robotic apparatus for providing communication to the robotic apparatus, a remote controller not attached to the track system nor robotic apparatus for providing command and control to the robotic apparatus, and a storage apparatus for providing electronic storage of data generated by the robotic apparatus and/or remote controller.

In another embodiment, an apparatus comprises a lightweight track, rail, or track-support frame (i.e. track system) which is elevated off the ground (e.g. suspended from the ceiling or a wall), and supports connection of one or more relatively small, lightweight, detachable, motorized robotic units that move along the track or rail system in either remote control or autonomous modes, wherein the track system is further comprised of means to connect multiple tracks, rails or track-support frames together and to a support structure (e.g. a ceiling or wall).

In another embodiment, a system comprises one or more relatively small, lightweight, detachable, motorized robotic units and one or more relatively small, lightweight, detachable, non-motorized units attached to the motorized robotic units by means of mechanical coupling, wherein the mechanical coupling may comprise electrical signal connection between the motorized and non-motorized units.

In another embodiment, an apparatus comprises a track switcher connected to a plurality of elevated track systems to support transferring a robotic unit from one track system to another track system.

In another embodiment, a method comprises determining if a robotic unit should transfer from one track system to another track system and subsequently controlling a track switcher.

In another embodiment, a method comprises determining if two or more robotic units are connected to an elevated track system and providing a network through which the units may communicate.

In another embodiment, a method comprises determining if and when two or more robotic units connected to and moving along an elevated track system may collide, and implementing processing to avoid the collision.

In another embodiment, an apparatus comprises a plurality of components connected to an elevated track system to support alignment and position of a connected robotic unit, wherein the components comprises but are not limited to rollers, gear racks, bar-code or other visual markers, infra-red, RF ID markers, magnets, etc.

In another embodiment, a method comprises determining position of and if a robotic unit is out of alignment on a track system and correcting the position or alignment based on processing sensor input from, but not limited to, motor encoders, rollers, gear racks, visual markers (e.g. bar-code), infra-red, RF ID, hall-effect sensors, etc.

In another embodiment, an apparatus comprises an electrical power source connected to a track system, and provides a plurality of battery charging outlets at locations connected to or adjacent to the track.

In another embodiment, a method comprises controlling or determining if an elevated robotic unit is operating in a manual or autonomous mode and executing processing based on the determining.

In another embodiment, a means comprises controlling a robotic unit running in a manual mode by one or more external devices, wherein the external devices may be, but are not limited to, a joystick, gamepad, a voice recognition unit, smart phone or tablet running application software.

In another embodiment, a method comprises determining if the battery level in an elevated robotic unit is below a threshold and moving the robotic unit to the closest and available charging outlet on the track.

In another embodiment, an apparatus comprises a fixed or pivotally-mounted module attached to the elevated robotic unit, wherein the module comprises a track cleaning apparatus and means.

In another embodiment, an apparatus comprises a fixed or pivotally-mounted module attached to the elevated robotic unit, wherein the module comprises a winch system apparatus and means.

In another embodiment, an apparatus comprises a fixed or pivotally-mounted module attached to a plurality of elevated robotic units, wherein the module comprises a video gaming platform system apparatus and means, wherein the platform on a first elevated robotic unit comprises a laser pen and the platform on a second elevated unit comprises a target screen and camera.

In another embodiment, an apparatus comprises a fixed or pivotally-mounted module attached to an elevated robotic unit, wherein the module comprises but is not limited to apparatus providing one or more displays and/or detections of lighting, audio, speech, video, cooling devices (e.g. fans), container (e.g. medical devices, medicine, oxygen, fluids, tools, etc.), WiFi/LiFi service or fire/smoke detection.

In another embodiment, an apparatus comprises a power distribution system in an elevated robotic unit for providing power to modules attached to the unit.

In another embodiment, an apparatus comprises a fixed or pivotally-mounted module attached to an elevated robotic unit, which includes a processor configured to process a plurality of sensor inputs and executing processing based on the inputs.

In another embodiment, a processor in a fixed or pivotally-mounted module attached to an elevated robotic unit comprises processing user defined instructions based on a set of published application programming interfaces (APIs).

In another embodiment, a method, in a module attached to an elevated robotic unit, comprises searching for a signal or combination of signals, wherein the signal or combination of signals comprises but is not limited to an image, radio, electromagnetic (e.g. infra-red), audio, speech, chemical (e.g. smoke), or combination of image, radio, electromagnetic, audio, speech, chemical, and wherein the searching comprises moving the unit along an elevated track system until a signal is acquired.

In another embodiment, a method comprises determining in a module attached to an elevated robotic unit if a sensor or combination of sensor signals (e.g. one or plurality of WiFi or LiFi signal power levels) received from a transmitting device (e.g. one or a plurality of WiFi LiFi transmitters) is below a threshold and executing processing to move the robotic unit to a location to maximize the one or plurality of received power levels.

In another embodiment, a method for tracking a moving object from an elevated robotic apparatus comprises processing one or more sensor input signals to produce a signature of the moving object, determining the direction of motion of the signature of the moving object, and actuating controller hardware on the elevated robotic apparatus to center the signature within a reference frame related to the type of sensor input.

BRIEF DESCRIPTION OF THE DRAWINGS

All aspects and the attendant advantages of the embodiments described herein will become more readily apparent by reference to the following detailed description when taken in conjunction with the accompanying drawings wherein:

FIG. 3a and FIG. 3b are perspective and detail view illustrations of an alternative embodiment Elevated Robotic Assistive Device System comprising a slotted track, slotted track with exit port, and robot apparatus.

FIG. 9A is a diagram of a rotating apparatus attached to an Elevated Robotic Assistive Device, while

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1:
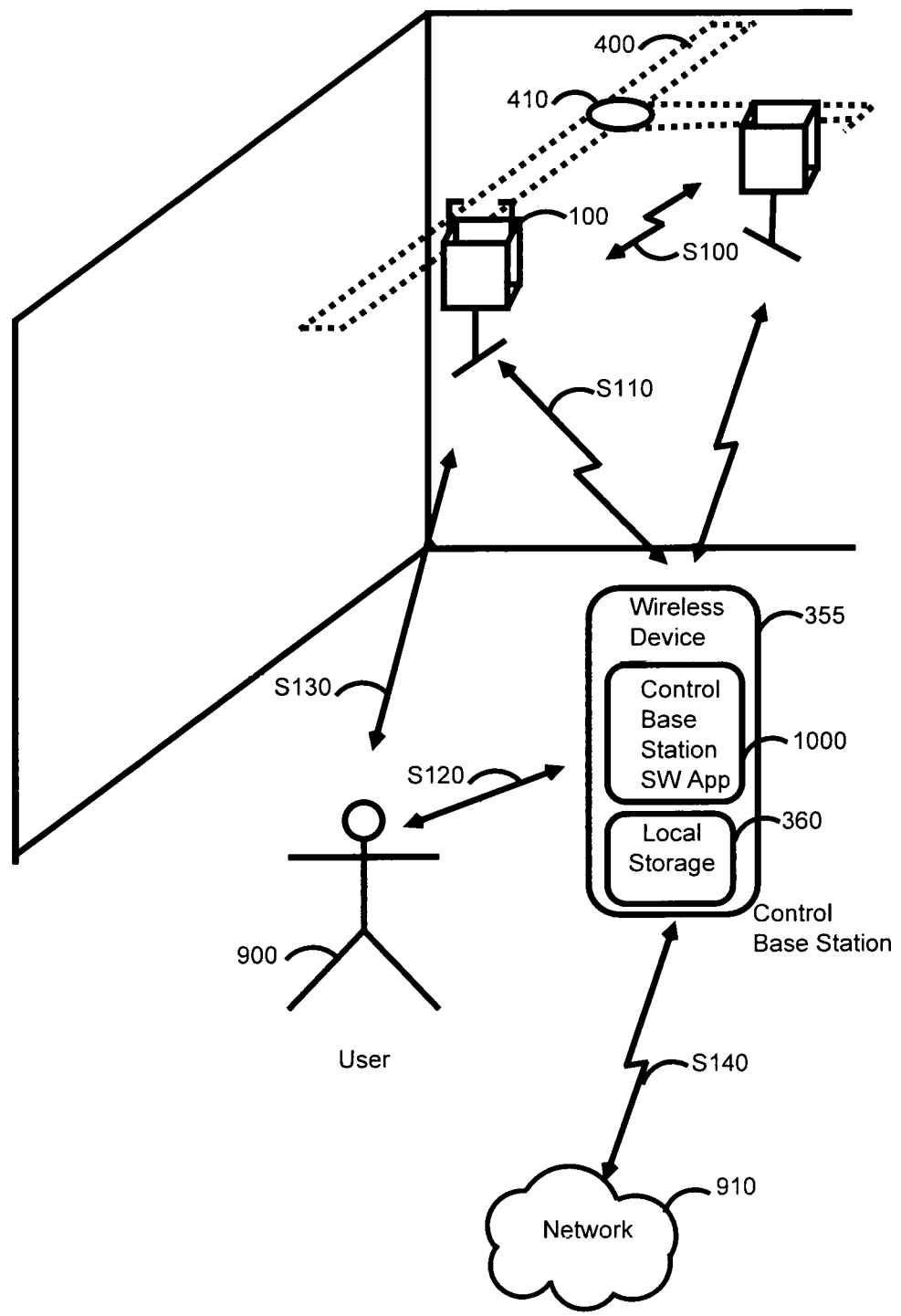
FIG. 1 is a block diagram illustrating an Elevated Robotic Assistive Device System in accordance with various embodiments.

A diagram of an Elevated Robotic Assistive Device (ERAD) System is shown in FIG. 1. A single or plurality of mobile ERADs 100 are attached to an elevated track 400 and travel to various points along the track 400 through either autonomous or manual (user controlled) modes. In an exemplary embodiment, Track 400 may be affixed to the ceiling or wall in a residence, school, factory, or warehouse. ERAD 100 may travel to additional tracks connected to track 400 by way of track switcher 410. Track switcher 410 serves to detach ERAD 100 from one track and reattach ERAD 100 to another track. It should be understood that the configuration of track 400 may take on different patterns, each connected by way of a track switcher 410 apparatus.

In an exemplary embodiment, ERAD 100 may function as a manually controlled or autonomous surveillance system, wherein images, video, or audio may be collected and/or transmitted to a local base station, security command center, or cloud based server. Alternatively, ERAD 100 may function as a medical assistance device, wherein supplies (e.g. medicine or oxygen) are delivered to a disabled user. Alternatively, ERAD 100 may function as a video gaming platform with a pan/swivel mount for a laser pen (e.g. the weapon) and a second mount with a target screen and camera for use in an interactive application, such as an indoor or outdoor laser tag arena. In support of one or more of the exemplary embodiments described herein, ERAD 100 may track a moving object in the environment.

In FIG. 1, ERAD 100 may communicate to one or more ERADs also attached to track 400 by wireless communication link S100 to form a network of autonomous or remotely controlled units. For example, the wireless communication link may comprise but is not limited to standard wireless technologies such as Bluetooth, WiFi, or Infra-red. The link may also be connected through physical connections (e.g. wires or metallic traces) along track 400 wherein contact of ERAD 100 on track 400 establishes communication between ERADs along the physical connections. ERAD 100 may also communicate to a peer ERAD through wireless device 355 using the same communication link technologies described herein. ERAD 100 may communicate to a wireless device 355 in a master slave fashion in support of a manual mode. In the manual mode, a Control Base Station (CBS) software application 1000 may be executed on wireless device 355, sending commands to ERAD 100 and receiving responses via communication link S110, using the same communication link technologies described herein. CBS 1000 may store data received from ERAD 100 in order to produce analytics or test results, or for other analysis. The data received may be stored in Local Storage 360, or to a cloud service existing in Network 910 through wired or wireless communication link S140 or may store data to both Local Storage 360 and Network 910.

A network of ERADs 100 attached to a track system 400 may communicate to each other autonomously or through remotely controlled software to established a coordinated system to accomplish tasks such as using multiple ERADs to carry a large load along the track, providing stereo audio sampling or playback (e.g. for a surround sound speaker system or game), or providing coordinated video feeds (e.g. for surveillance or gaming) to name a few. In supporting the coordinated tasking of the network of ERADs attached to a track system, a collision avoidance system must be in place. A collision avoidance system may comprise but is not limited to a local vision recognition/detection system (i.e. local to the ERADs) of a vision marker (e.g. another ERAD, a bar code, an infra-red beacon) or remote logging of ERAD historical positions on the track (e.g. the control software knows where each and every ERAD has been on the track and knows where it is headed so can predict if and when two ERADs are on a collision course and send appropriate commands to move each of the ERADs accordingly).

Alternatively, a network of ERADs 100 may comprise one or more motorized units and one or more non-motorized units attached to the motorized units by means of mechanical coupling, wherein the mechanical coupling may comprise electrical signal connection between the motorized and non-motorized units. Communication between the motorized and non-motorized units may occur through S100, wherein S100 comprises a wired link, and communicates via protocols, which may include but are not limited to USB, Ethernet, or FireWire. In an exemplary embodiment, motorized ERAD may provide basic control and mobility functionality, whereas attached non-motorized ERADs may provide advanced features, such as image, audio, or communication processing.

In FIG. 1, user 900 may interact with CBS software app 1000 executing on wireless device 355 via touch or voice command link S120. Actions issued by user 900 may flow from CBS software app 1000 executing on wireless device 355 to ERAD 100 via wireless link S110. Similarly, ERAD 100 may respond to commands or send unprompted status to user 900 through CBS software app 1000 executing on wireless device 355 by way of wireless link S110. User 900 may also communicate directly to ERAD 100 through audio (e.g. voice) or video (e.g. image detection) command link S130.

Figure 2A:
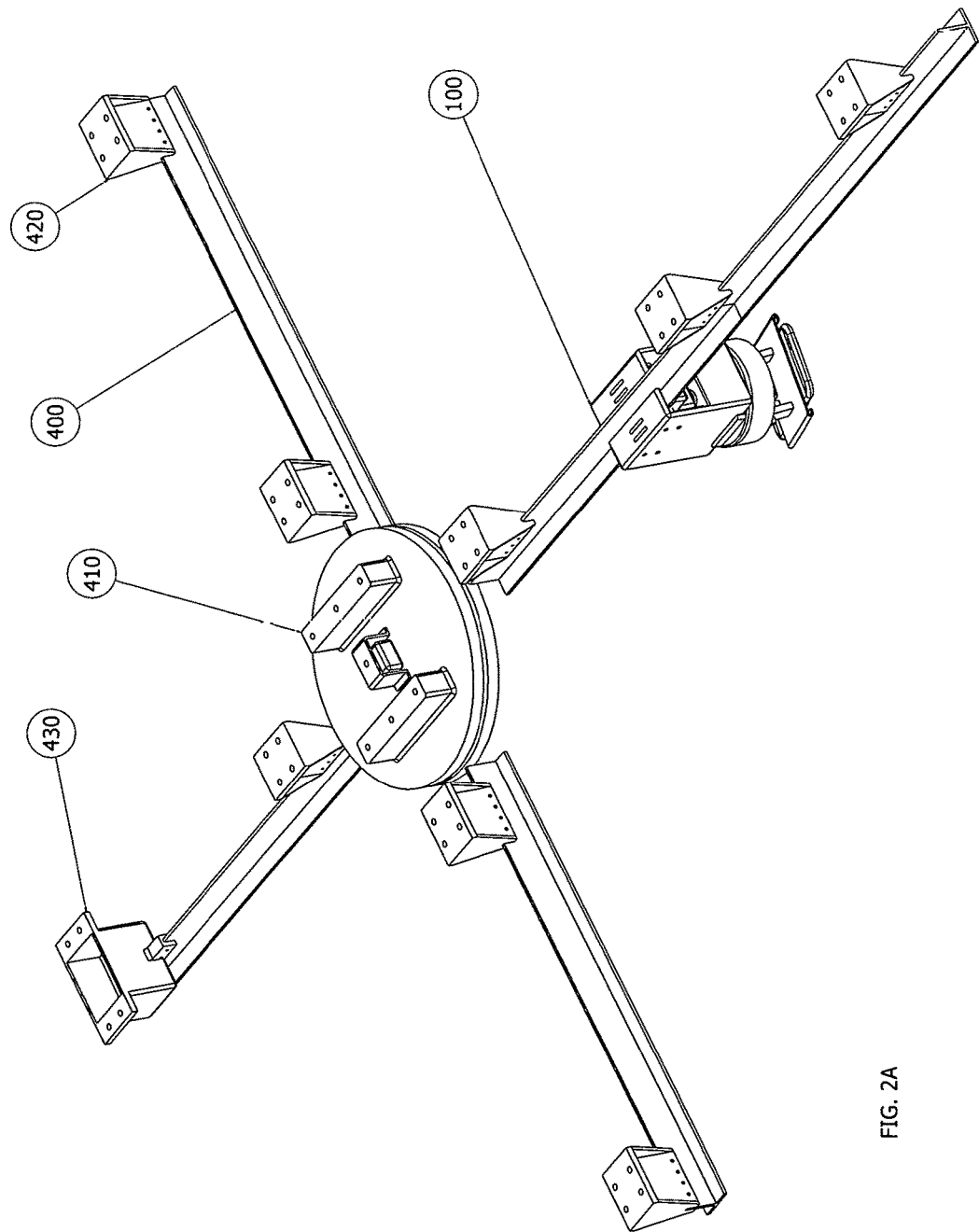
FIG. 2a and FIG. 2b are perspective view illustrations of an Elevated Robotic Assistive Device comprising a track, track switcher apparatus, track brackets, robot apparatus, and charging station.

A perspective view of an Elevated Robotic Assistive Device comprising a track, track switcher apparatus, track brackets, robot apparatus, and charging station is shown in FIG. 2A. ERAD 100 is attached to track 400. Track 400 may comprise a rigid vertical plate attached to a rigid horizontal plate, forming an inverted "T" shape, wherein ERAD 100 travels upon the horizontal plate. Track 400 is attached to an elevated structure (e.g. a ceiling or a wall) by mounting brackets 420. An alternate mounting bracket assembly may attach to a drop ceiling stringer by a tension clip or similar mechanism or a threaded clamp assembly. In the alternate mounting bracket assembly, a swivel mechanism may be mounted to the clip or clamp assembly to allow the attached mounting bracket to turn at angles relative to the stringer. In this configuration, the track system could be mounted to a drop ceiling at any angle referenced to the stringers. A plurality of tracks 400, each of identical or different lengths, may be constructed to form a unique latitudinal and longitudinal path along the elevated structure. The latitudinal and longitudinal tracks 100 are connected by track switcher 410. Track switcher 410 may comprise a fixed section attached to an elevated structure, and the fixed section attached to a rotating disk and section of track 400, which is attached to the underside of the rotating disk, and wherein track switcher 410 may be rotated to align with latitudinal or longitudinal tracks 100, and wherein ERAD 100 traverses from a latitudinal track 400 to a longitudinal track 400 by positioning itself on the section of track 400 attached to the bottom of track switcher 410 and activating track switcher 410 to rotate until it is aligned with the longitudinal track 400. Though FIG. 2A shows straight track 400 sections, it should be understood that track 400 may comprise curved sections, such that a ERAD 100 may traverse around a corner on a single track without the need for a track switcher 410. Further, though track 400 is described as an inverted "T" shape, it should be understood that track 400 may take on other shapes such as an I-beam such that ERAD 100 may be attached to an existing beam in a building support structure. In an I-beam track system, ERAD 100 is attached to the bottom horizontal plate of the I-beam in the same fashion as the inverted "T" track.

In FIG. 2A, charging station 430 may be mounted to the elevated structure and attached to track 400. ERAD 100 may traverse track 400 to charging station 430 and remain docked at charging station 430 while its battery is charging, and wherein ERAD 100 may be considered docked at charging station when a contact switch located on the charging station 430 is activated by the ERAD housing apparatus or if contact pads located on the ERAD housing apparatus connect with corresponding contact pads on charging station 430.

In FIG. 2A, a detachable track cleaner may be attached to ERAD 100 in order to remove debris from track 400. The detachable track cleaner may comprise, but is not limited to mounting hardware and apparatus comprised of brushes, plows, squeegee, or swabs.

Figure 2B:
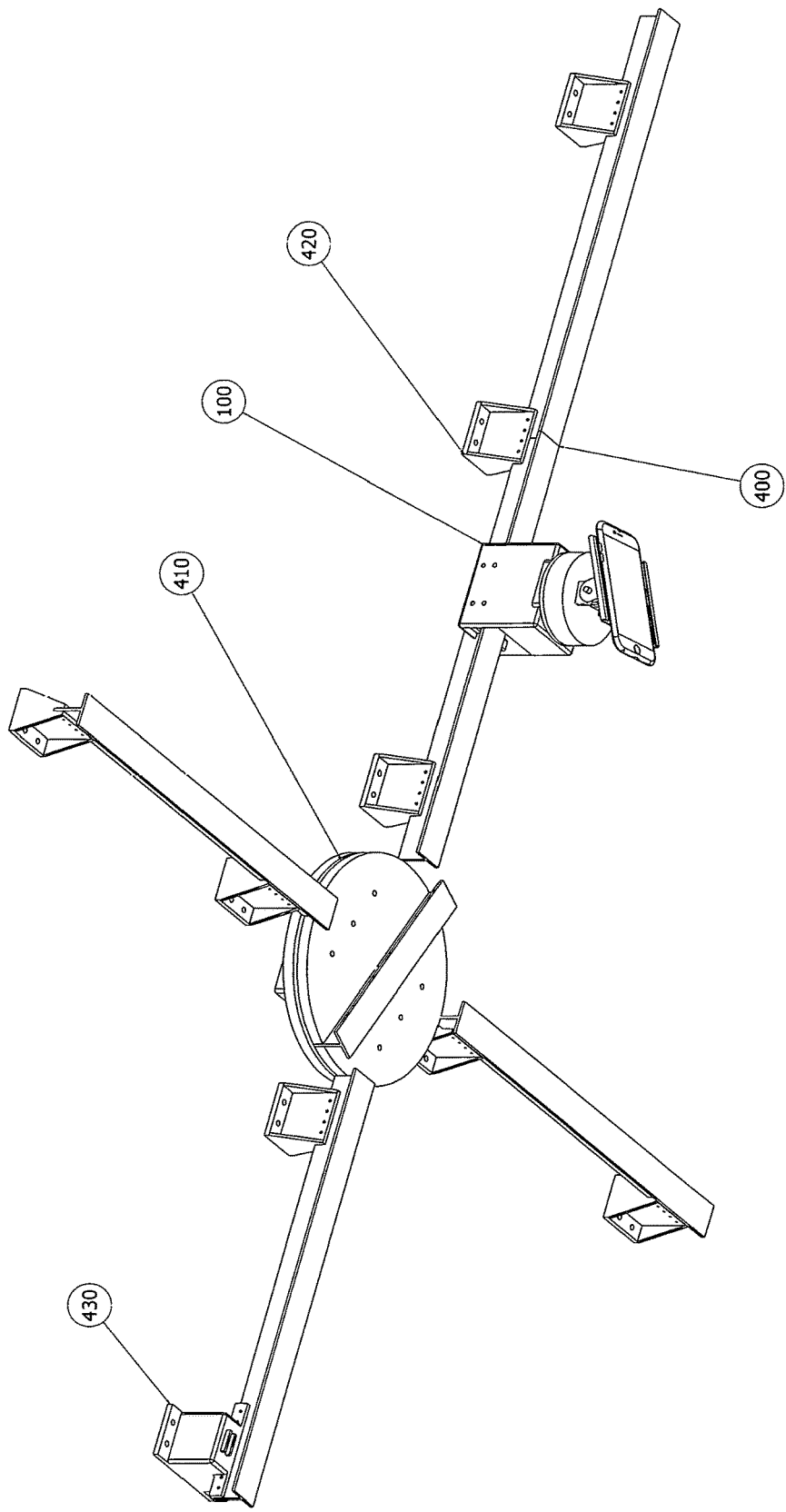

Another perspective view of an Elevated Robotic Assistive Device comprising a track, track switcher apparatus, track brackets, robot apparatus, and charging station is shown in FIG. 2B. Track switcher 410 displays an exemplary rotating section described herein with section of track 400 attached to the underside. Charging station 430 displays an exemplary contact switch and pads for connecting to ERAD 100.

Figure 6:
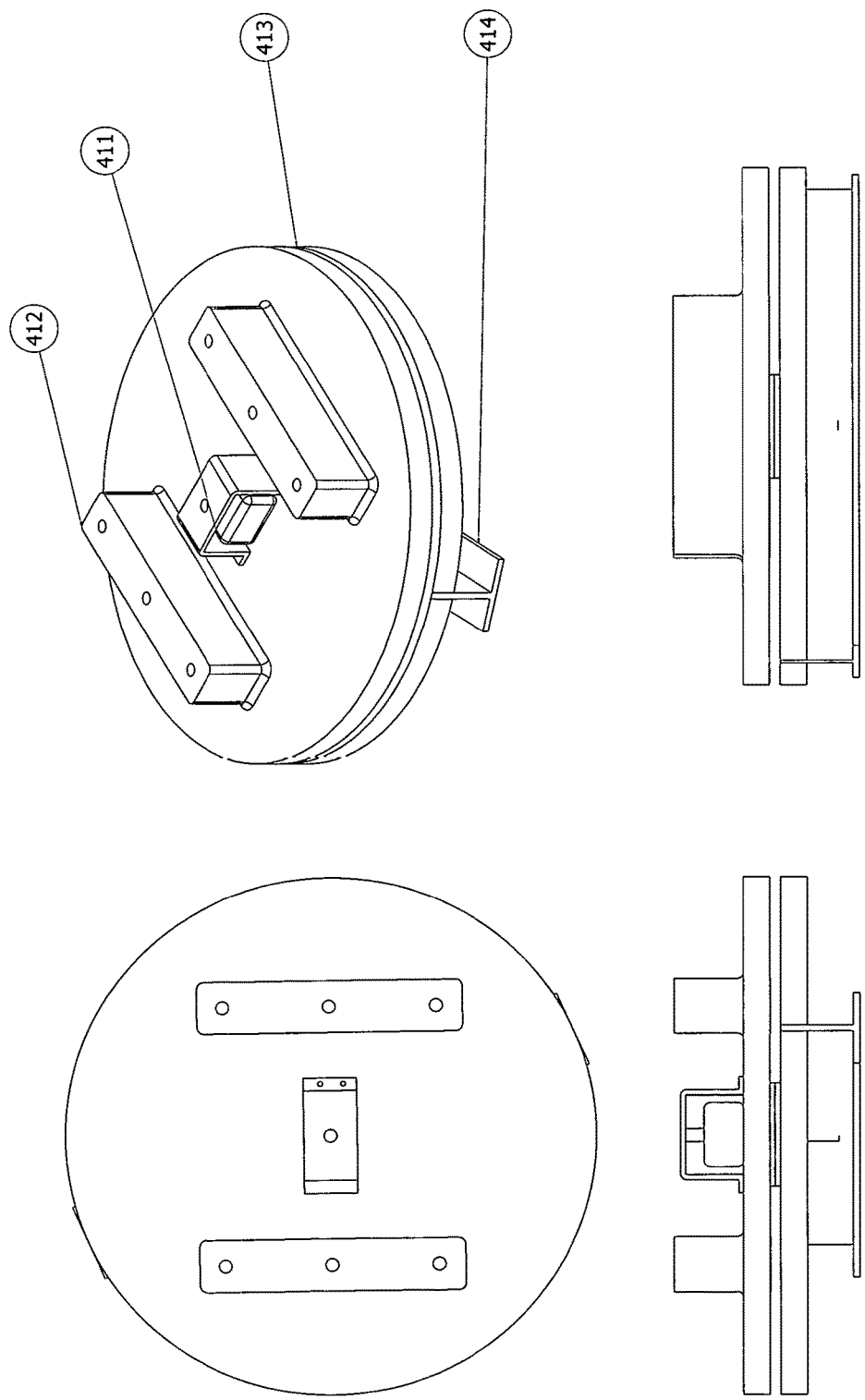
FIG. 6 is a perspective view illustration of Elevated Robotic Assistive Device Track Switcher apparatus.

A detailed perspective view illustration of the Elevated Robotic Assistive Device Track Switcher 410 is shown in FIG. 6. A fixed section 412 comprises brackets to mount to an elevated structure (e.g. a ceiling or wall), a motor box and bracket 411 to rotate the rotating section 413, and a track 414 which is a short length but mechanically identical or similarly dimensioned track structure to track 400. Track switcher 410 serves to detach ERAD 100 from one track and reattach ERAD 100 to another track as described herein.

A perspective and detail view illustration of an alternative embodiment Elevated Robotic Assistive Device System comprising a slotted track, slotted track with exit port, and ERAD chassis is shown in FIG. 3A and FIG. 3B. ERAD chassis 1100 displays an exemplary frame, wheel and axle configuration, and pin structure, wherein the dimensions of frame, wheels and pin are such that ERAD chassis 1100 may be inserted in slotted track 1201 or slotted track with exit port 1200. Slotted track with exit port 1200 and slotted track 1201 may be attached to an elevated structure, and are comprised of rigid plates attached together to form a rectangular shape. Slotted track with exit port 1200 and slotted track 1201 include a slot positioned in the center and bottom of the track, wherein ERAD chassis 1100 pin structure inserted in track 1200 or 1201 protrudes through the slot, and serves to provide a structure from which an ERAD housing including, but not limited to, electronics, motors, gears, and sensors may be attached, and to provide alignment for robot apparatus 1100 on track 1201 or 1202. Slotted track with exit port 1200 and slotted track 1201 may be connected together with one track assuming a "male" configuration and the other track a "female" configuration such that one track may be inserted and attached to the other track, and provide a latitudinal and longitudinal track path configuration.

Figure 5B:
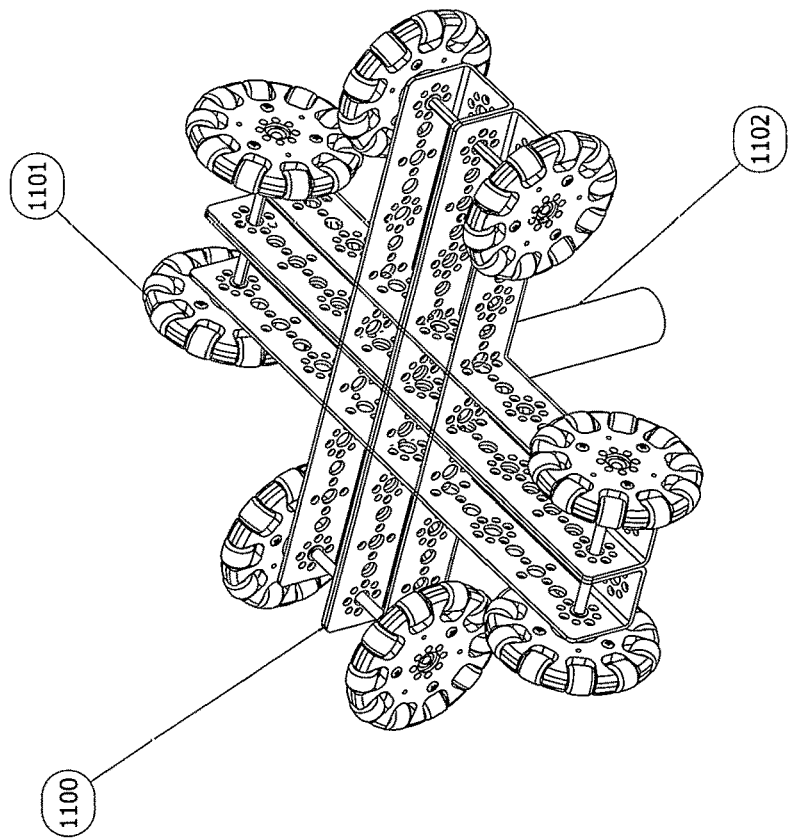
FIG. 5a and FIG. 5b are perspective illustrations of an alternative embodiment Elevated Robotic Assistive Device robot apparatus comprising chassis, omni wheels, and alignment pin.
Figure 5A:
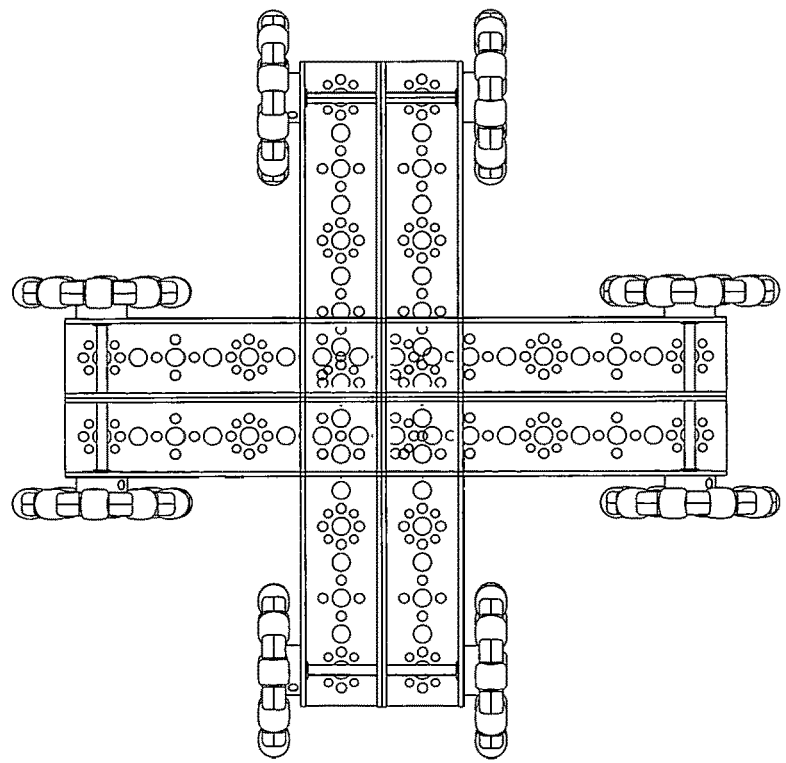

In FIG. 3B, slotted track with exit port 1200 provides a path for ERAD chassis 1100 to traverse from a latitudinal track to longitudinal track without the need for a track switcher described herein. Traversing this alternative track configuration assumes an ERAD chassis as shown in FIG. 5A and FIG. 5B, wherein the drivetrain wheels comprise a specific construction. For example, the wheels 1101 shown in FIG. 5B are of omni type, wherein the wheels are comprised of a hub with small disks attached along the circumference of the hub and perpendicular to the turning direction. This construction allows the wheel to rotate in the forward direction of rotation as well as slide laterally (perpendicular to the wheel hub) along the small disks attached to the hub. Though FIG. 5B shows an apparatus with omni wheels, it should be recognized that any wheel types or drive systems that allows lateral movement are included in this disclosure, such as swerve drive, holonomic drive, kiwi drive, x-drive, mecanum drive, which are all well known to those skilled in the art.

FIG. 5B displays an exemplary chassis configuration for robot apparatus 1100. Those skilled in the art will recognize other configurations could be considered, such as a triangular shape with only 3 wheels 1101 as implemented in a kiwi drive system. FIG. 5B also displays an exemplary pin 1102 structure which is attached to chassis 1100. As described herein, the pin protrudes through slot in slotted tracks 1200 or 1201 in FIG. 5B and serves to hold a robot housing for electronics, motors, gears, and sensors as well as to align robot apparatus 1100 within tracks 1200 or 1201.

Figure 4:
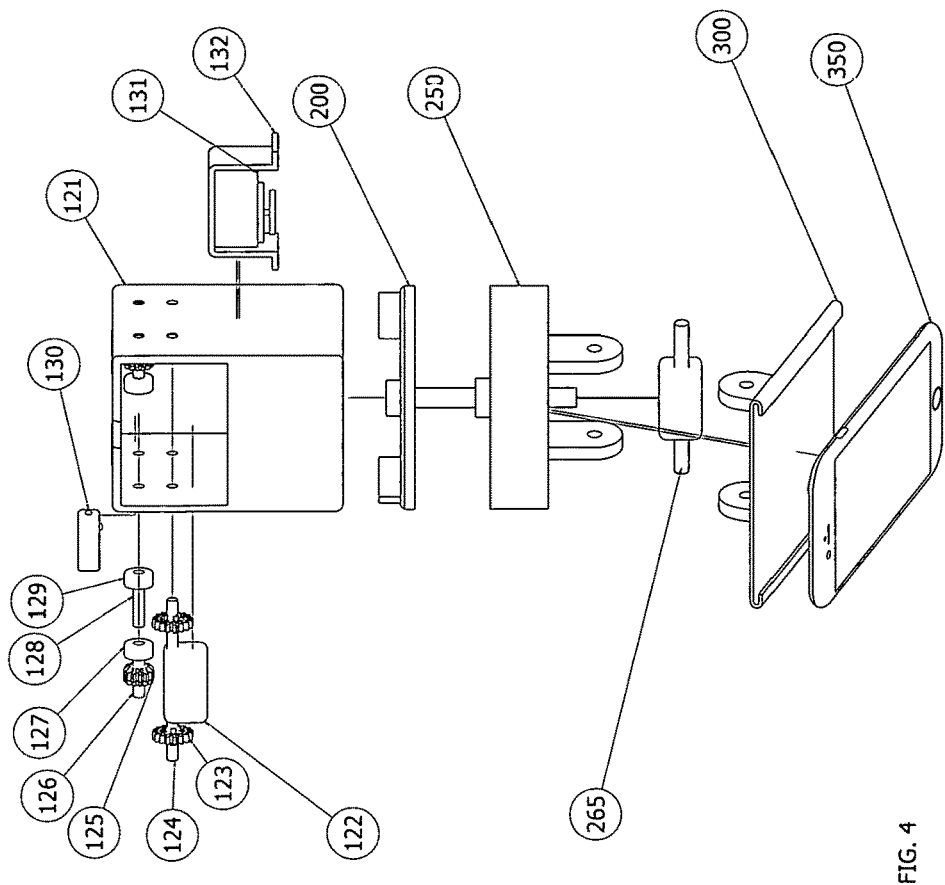
FIG. 4 is a detailed perspective view illustration of an Elevated Robotic Assistive Device.

A detailed perspective view illustration of an Elevated Robotic Assistive Device is shown in FIG. 4, corresponding to robot apparatus 100 of FIG. 1. Housing 121 serves to provide a rigid structure to traverse along track 400 of FIG. 1, and provide a protective enclosure for items including, but not limited to, electronics, motors, gears, and sensors. In an exemplary embodiment, ERAD 100 is propelled by electronic motor box 122, which is attached to and rotates drive motor axle 124, which in turn is attached to and rotates drive motor gear 123. In an exemplary embodiment, drive motor gear 123 may mesh with and rotate drive roller gear 125, which is attached to and rotates drive roller axle 126, which in turn is attached to and rotates drive roller 127. Implementing a multiple gear drive train as described with drive motor gear 123 and drive roller gear 125 allows for implementing a gear ratio to increase the speed or torque of drive roller 127. Drive roller 127 rests on the horizontal plate of track 400 and rotates when ERAD 100 traverses along track 400. It should be understood that motor box 122 may be directly attached to drive roller 127 through an axle to reduce the need for a gear mesh and additional roller components. In an exemplary embodiment, free roller axle 128 and free roller 129 serve to stabilize ERAD 100 on track 400, and may or may not be driven by a motor box. Free roller 129 rests on horizontal plate of track 400 and rotates when ERAD 100 traverses along track 400.

Figure 7:
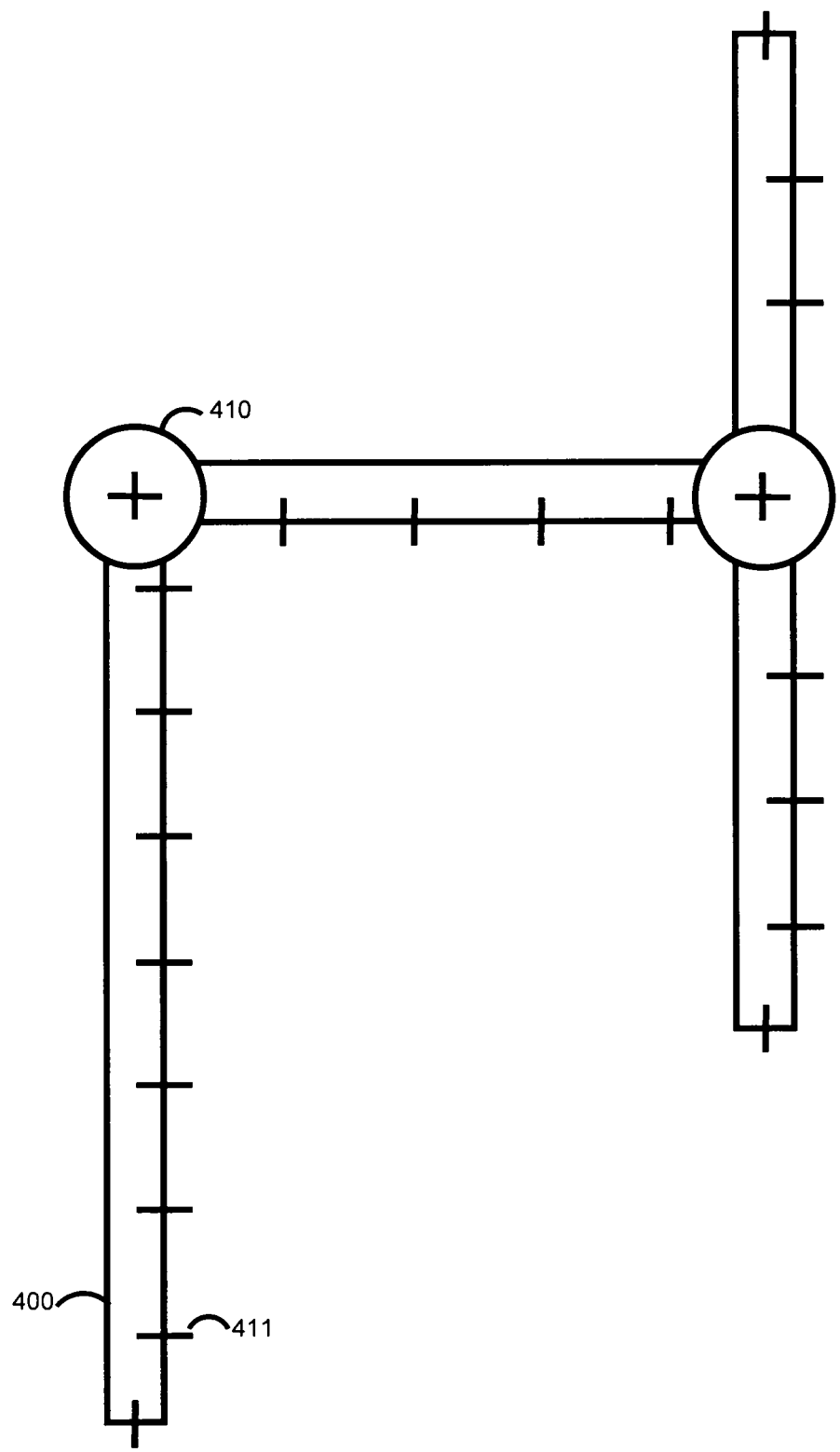
FIG. 7 is a diagram of an Elevated Robotic Assistive Device Track Map comprising a track, track switcher, and track markers.

In an exemplary embodiment, track alignment sensor 130 in FIG. 4 is mounted either inside or outside housing 121 and serves to provide sensor feedback to a control module for track alignment processing. The track alignment sensor 130 may comprise, but is not limited to, light-emitting-diode, bar-code reader, infra-red detector, RF ID detector, or hall-effect sensors, wherein markers placed on track 100 activate the sensors (e.g. magnet markers for hall-effect sensor). FIG. 7 displays an exemplary embodiment of the track markers 411 on a track 400. The track markers 411 may be placed at regular, periodic positions on track 400 or may be positioned more sparsely at points of interest such as, but not limited to, where high traffic areas exist underneath (e.g. where multiple people or objects are positioned at particular instances in time), where beacons exist nearby, where charging stations 430 exist on track 400, prior or after a track switcher 410, within a track switcher 410, or at the end of a track 400.

In an exemplary embodiment, control device 350 in FIG. 4 is attached to a control device holder 300 and serves to provide sensor and processor functionality to ERAD 100 for use in autonomous or manual operational modes. The control device 350 may include, but is not limited to, a smart phone, tablet, off-the-shelf sensor circuit or custom sensor circuit. The control device 350 and holder 300 are rotated along a "yaw" axis by rotating control module holder 250, which is rotated by yaw rotation motor 131 by way of an axle that runs through control module holder base 200 and is attached to rotating control module holder 250. Control module holder base 200 serves to attach rotating control module holder 250 to housing 121. Control device 350 is rotated along the "pitch" axis by control device pitch rotation motor and axle 265.

In an exemplary embodiment, yaw rotation motor 131 in FIG. 4 is mounted to housing 121 by yaw rotation motor bracket 132, however it should be understood that yaw rotation motor 131 may also be mounted directly to rotating control module holder 250.

In an exemplary embodiment, a detachable track cleaner may be attached to housing 121 in FIG. 4 in order to remove debris from track 400. In another exemplary embodiment, a detachable track cleaner may be attached to rotation control module holder 250 or control device holder 300 to provide rotation along a pitch and yaw axis. The detachable track cleaner may comprise, but is not limited to, mounting hardware and brushes, plows, squeegee, or swabs.

Figure 12:
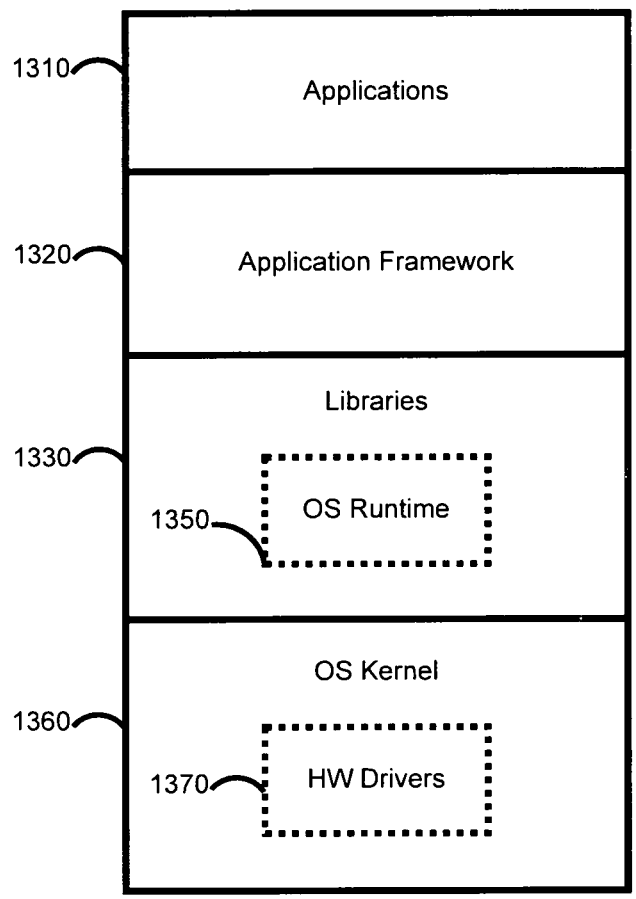
FIG. 12 is a diagram of an Elevated Robotic Assistive Device Control Base Station Software Stack.
Figure 13:
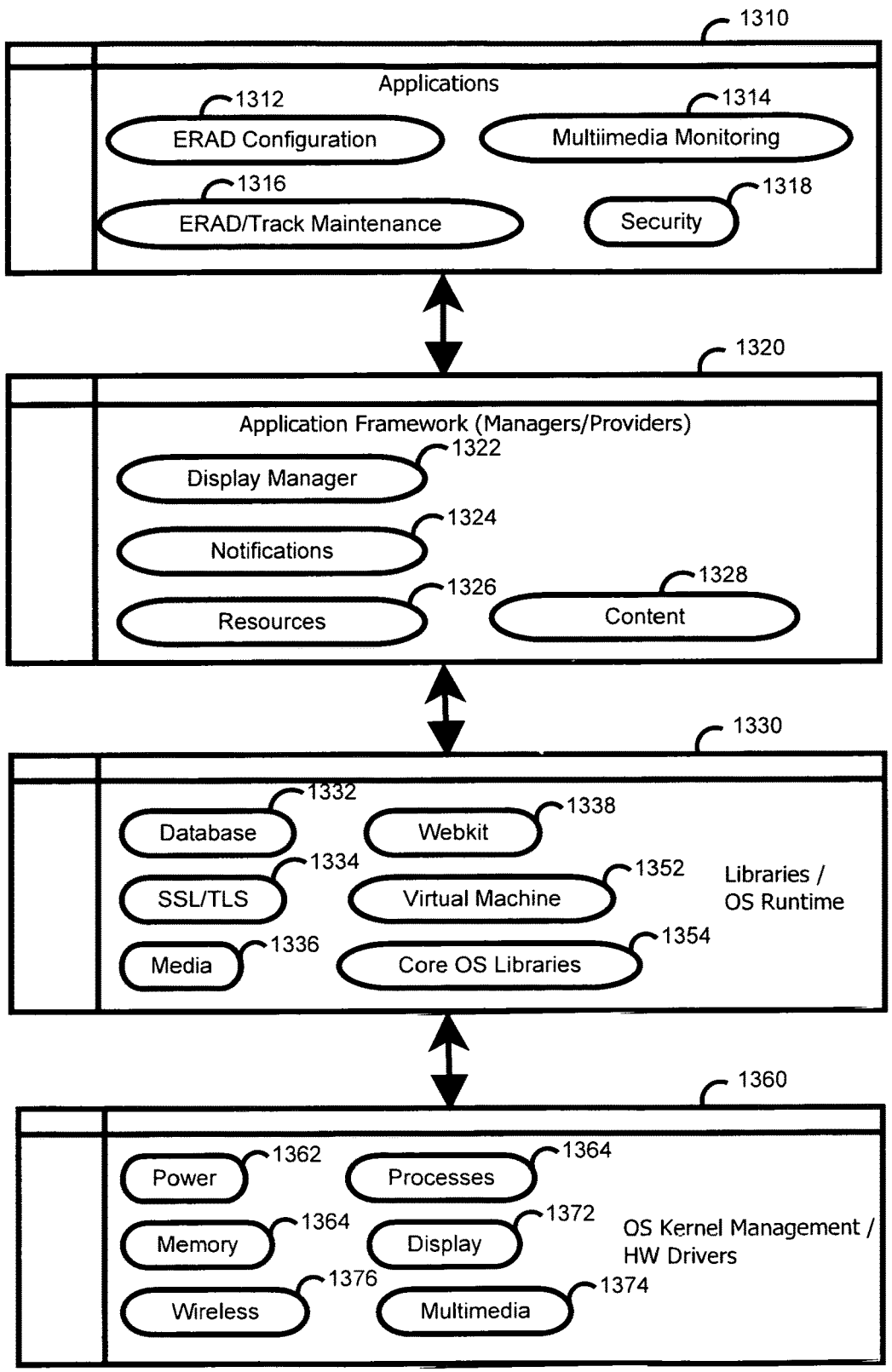
FIG. 13 is a detailed diagram of an Elevated Robotic Assistive Device Control Base Station Software Stack.

As shown in FIG. 1, wireless device 355 comprises CBS software application 1000. CBS software exists as an application 1310 on software stack shown in FIG. 12, and includes, but is not limited to, application examples shown in FIG. 13 such as Robot Configuration 1312 to setup the electronic profile of the ERAD, Multimedia Monitoring 1314 to transmit or receive audio or video signals in an environment, ERAD/Track Maintenance 1316 to run ERAD diagnostics or clean the track, or Security 1318 to detect and track audio or video signals in an environment. Applications 1310 on software stack access software managers and providers via application framework 1320. Application framework 1320 includes, but is not limited to, display manager 1322 to setup and control display layouts, notifications 1324 to manage communication to application 1310 such as user input, access to resources 1326 such as uniform resource locators (URLs), and content 1328 such as animations, audio or video. Application framework 1320 on software stack accesses libraries/OS Runtime 1330 components, including but not limited to, databases 1332 such as structured query language (SQL) for efficient storage and retrieval of data, security protocols such as secure socket layer or transport layer security (SSL/TLS) 1334 for secure access to web sites and cloud based networks, media 1336 for access to audio or video playback engines, webkit 1338 for access to web browsers, virtual machine 1352 such as a java virtual machine (JVM) used to run java compiled code, basic device drivers in core OS libraries 1354. Library/OS Runtime 1330 component accesses device hardware through OS kernel management/HW drivers 1360 and includes, but is not limited to, power manager 1362 to setup and control energy use in the device, memory manager 1364 to allocate and deallocate memory, processes 1364 to manage and secure multiple tasks running simultaneously in a multi-tasking or multi-threaded environment, display 1372 to setup and control display hardware, and multimedia 1374 to setup and control audio, video, graphics and other multimedia based hardware.

Figure 14:
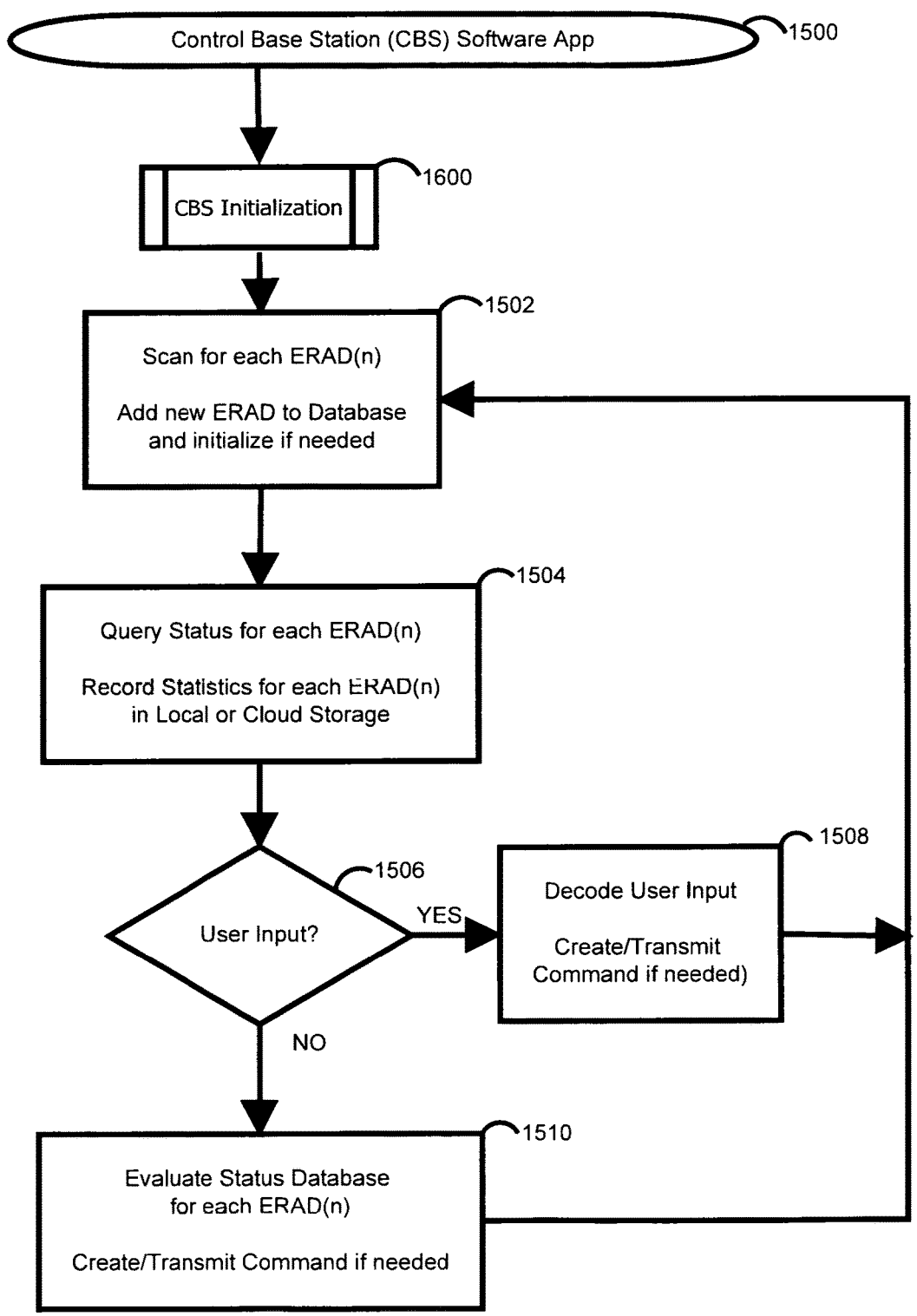
FIG. 14 is a flow diagram of an Elevated Robotic Assistive Device Control Base Station Software Application.
Figure 15:
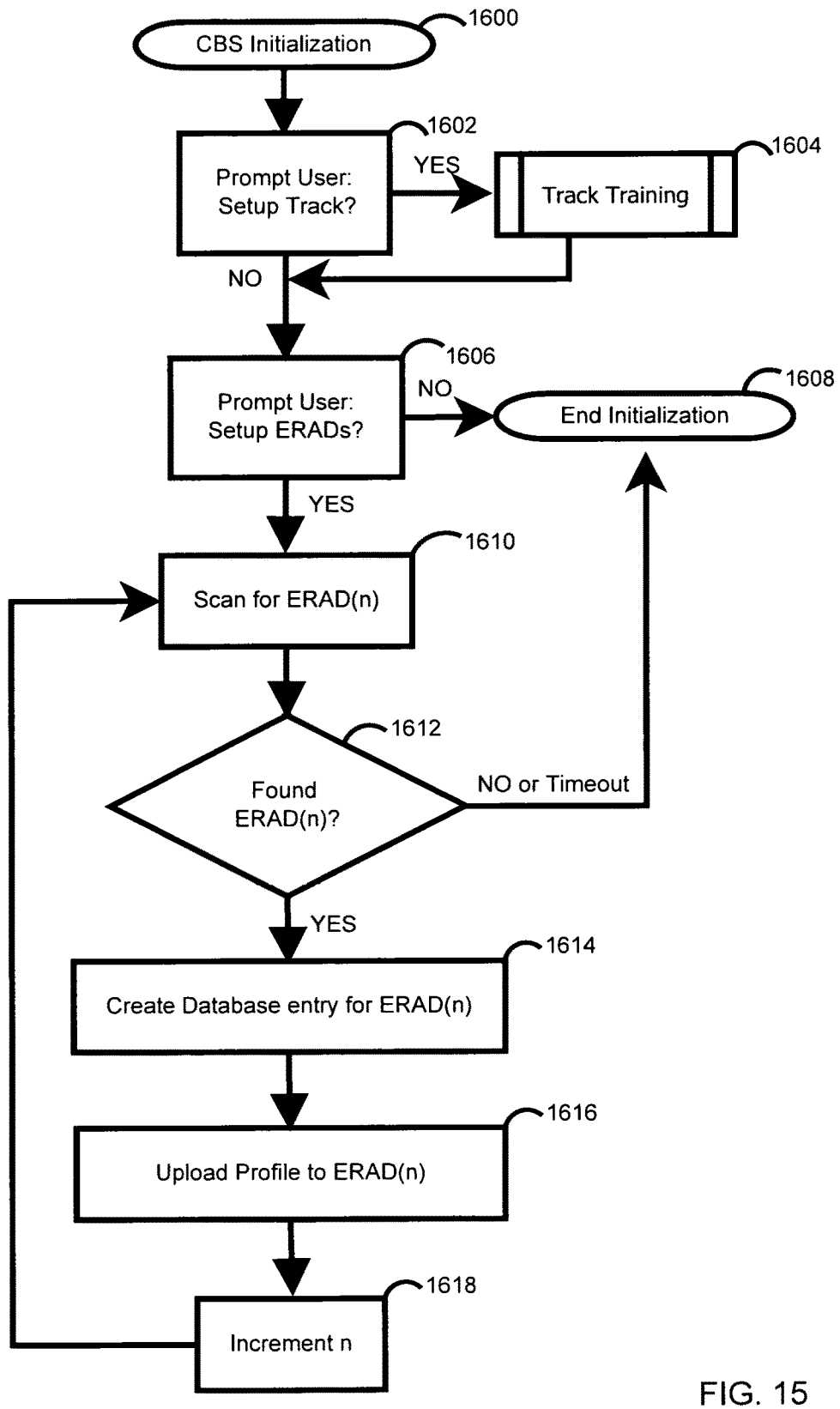
FIG. 15 is a flow diagram of an Elevated Robotic Assistive Device Control Base Station Software Initialization routine.

A flow diagram of an Elevated Robotic Assistive Device Control Base Station Software Application is shown in FIG. 14. The algorithm begins with an initialization routine 1600, with detailed flow diagram shown in FIG. 15 and as described subsequently. The initialization sequence serves to setup the system including the track and all ERADs, create database entries for each ERAD, and configure each ERAD with a profile. In FIG. 15, a user is prompted to setup the system track in 1602. If the user has not yet setup a track or needs to modify an existing track (e.g. sections added/removed) then YES is selected and a track training routine 1604 is executed. In 1602, if the user has already setup a track or simply wants to setup an ERAD then NO is selected and the user is then prompted in 1606 to setup the ERADs in the system. If the user selects NO in 1606 then the initialization routine is terminated, 1608, and control is passed back to the CBS software application 1500. In 1606, if YES is selected then the initialization routine scans for ERAD(n) in 1610 where n ranges from 1 to N+1 (i.e. one to the total number of ERADs that exist in the system plus one). Scanning for an ERAD(n) may include, but is not limited to, attempting to establish a wireless connection (e.g. WiFi, Bluetooth), attempting to establish a wired connection, or attempting to establish a connection using another communication protocol. In 1612, if an ERAD(n) is not found within a timeout interval, then the initialization routine is terminated, 1608, and control is passed back to the CBS software application 1500. The timeout interval may include, but is not limited to, an absolute timer period (e.g. 20 seconds) or a number of attempts to connect (e.g. 10 attempts). An ERAD(n) may not be found if there is an error in the communication link or if n=N+1 (i.e. one more ERAD than exists in the system). Finding a ERAD(n) may include, but is not limited to, establishing a communication link with a unique WiFi Media Access Control (MAC) address or some other unique communication signature. If an ERAD(n) is found in 1612, a database entry is created for the ERAD(n) and stored either in local storage 360 or cloud storage in network 910 of FIG. 1. It should be understood that if an ERAD(n) has already been scanned (i.e. a database entry already exists) then the existing database entry may be updated to log the repeated scan, but a new database entry would not be created. Once a database entry has been created for ERAD(n), 1614, a profile for ERAD(n) is created and uploaded to ERAD(n), 1616. The profile for ERAD(n) may include all or a subset of, but not limited to, name, identifier, mac address (if WiFi enabled), sensor thresholds (e.g. low battery level, communication link power levels, microphone input volume level, video input resolution), output audio volume levels, video display brightness, speed settings, alignment algorithm parameters, mode (e.g. manual or autonomous). Once the profile has uploaded to ERAD(n) in 1616, the ERAD index n is incremented and the process starting at 1610 is repeated until n=N+1 (i.e. one more ERAD than exists in the system), after which the initialization routine is terminated, 1608, and control passed back to the CBS software application 1500.

Returning to CBS software application 1500 of FIG. 1, and after CBS Initialization 1600, the application enters the main processing loop starting with 1502 wherein any new ERADs added to the system are detected, added to the database, and initialized if needed, using all or a subset of the initialization routine, 1600. Control is then passed to 1504 where each ERAD(n) is queried for status and statistics are recorded in the database entry assigned to ERAD(n), either in local storage 360 or cloud storage in network 910 of FIG. 1. Control is then passed to determine if a user generated command should be sent to ERAD(n), as determined by user input query, 1506. If the user has input a command, then control is passed to 1508 where the user input is decoded and a command is generated and transmitted to ERAD(n) if needed. If a user input has not occurred in 1506, then control is passed to 1510 where the database entry for ERAD(n), 1510, is evaluated and a command is generated and transmitted to ERAD(n) if needed.

Figure 16:
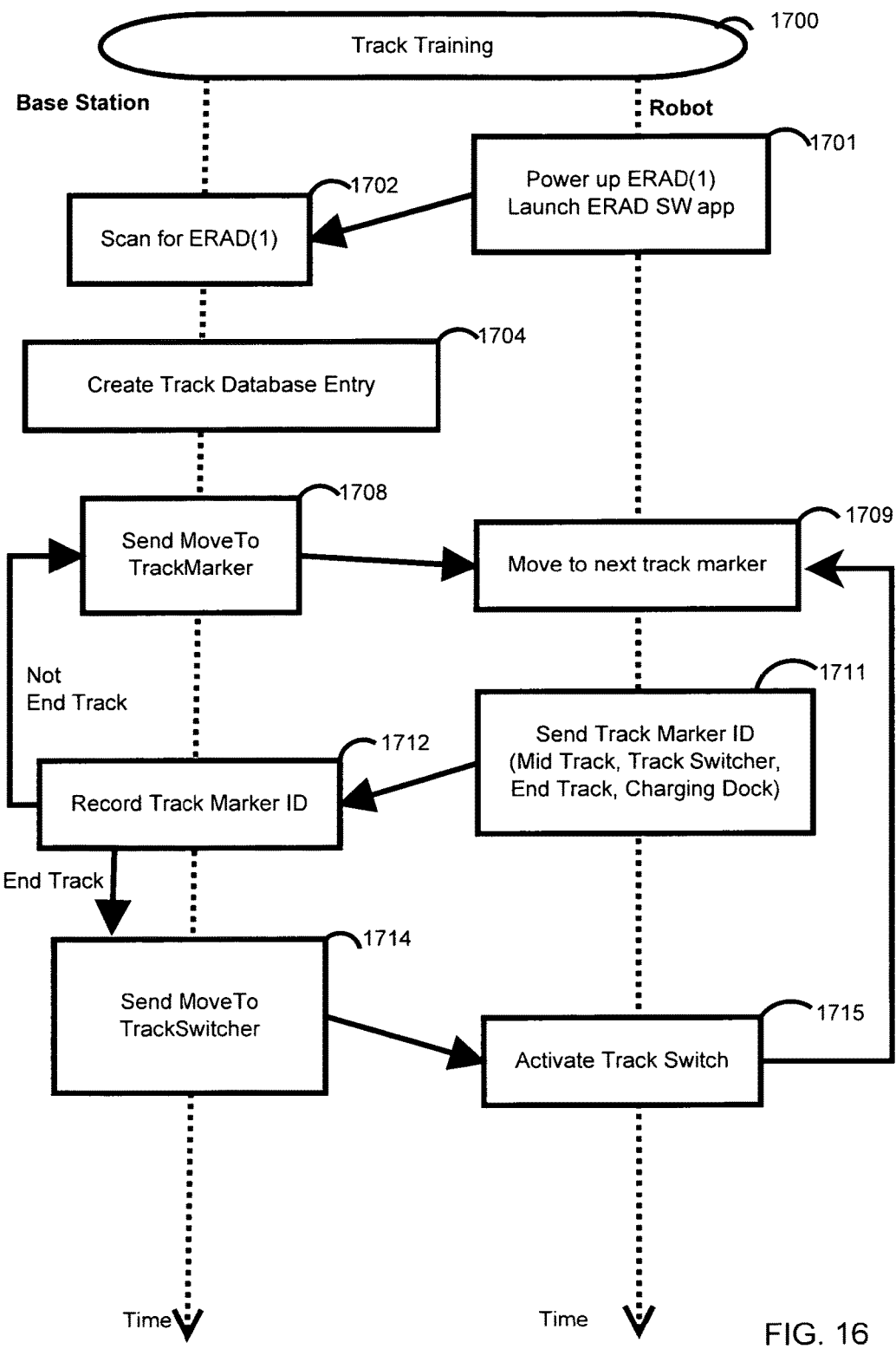
FIG. 16 is an activity flow diagram of an Elevated Robotic Assistive Device Track Training algorithm comprising the interaction between a base station controller and ERAD controller.

If a user selects the option to setup a track in 1602 of FIG. 15, control is passed to 1700 of FIG. 16, which shows an activity flow diagram of an Elevated Robotic Assistive Device Track Training algorithm comprising the interaction between a base station controller and ERAD controller. The activity flow diagram begins with a single ERAD (e.g. ERAD(1)) powered up, positioned on the track, and initialized through either configuration via CBS or execution of local initialization software on the ERAD. It should be understood that multiple ERADs could be powered up to participate in the track training algorithm. The base station device, executing track training software, continually scans, 1702, and creates a track database entry, 1704, once ERAD (1) is detected. A command is then sent by the base station to ERAD(1) to move to the next track marker. A track marker may include, but is not limited to bar-code, light, infra-red, magnet, etc. as described herein. ERAD(1) receives the command and moves to the next track marker, 1709. Once ERAD(1) reaches the next track marker, it sends a response, 1711, to the base station indicating a track marker number identifier and track marker type identifier (e.g. mid-track, end-track, track-switcher, charging station). The base station receives the response and records the track marker information in the track database, 1712. If the received track marker type identifier is not an end-track, then control is passed back to 1708 and a new commands is sent to the ERAD(1) to move to the next track marker and the process repeats until an end-track type identifier is received by the base station. If an end-track type identifier is received by the base station, control is passed to 1714 and a commands is sent by the base station to ERAD(1) to move to the track switcher. The ERAD(1) receives the command and moves to the track switcher and activates the track switch, 1715. Control is then passed to 1709 and the ERAD(1) moves to the next track marker and repeats the process at 1711.

Figure 17:
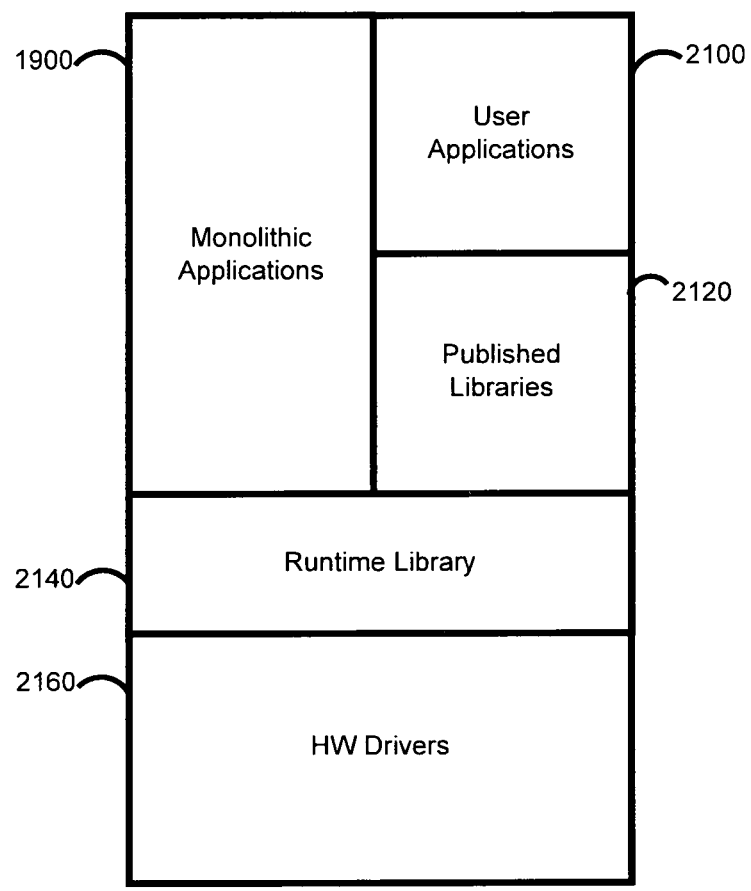
FIG. 17 is a diagram of an Elevated Robotic Assistive Device Software Stack.
Figure 20:
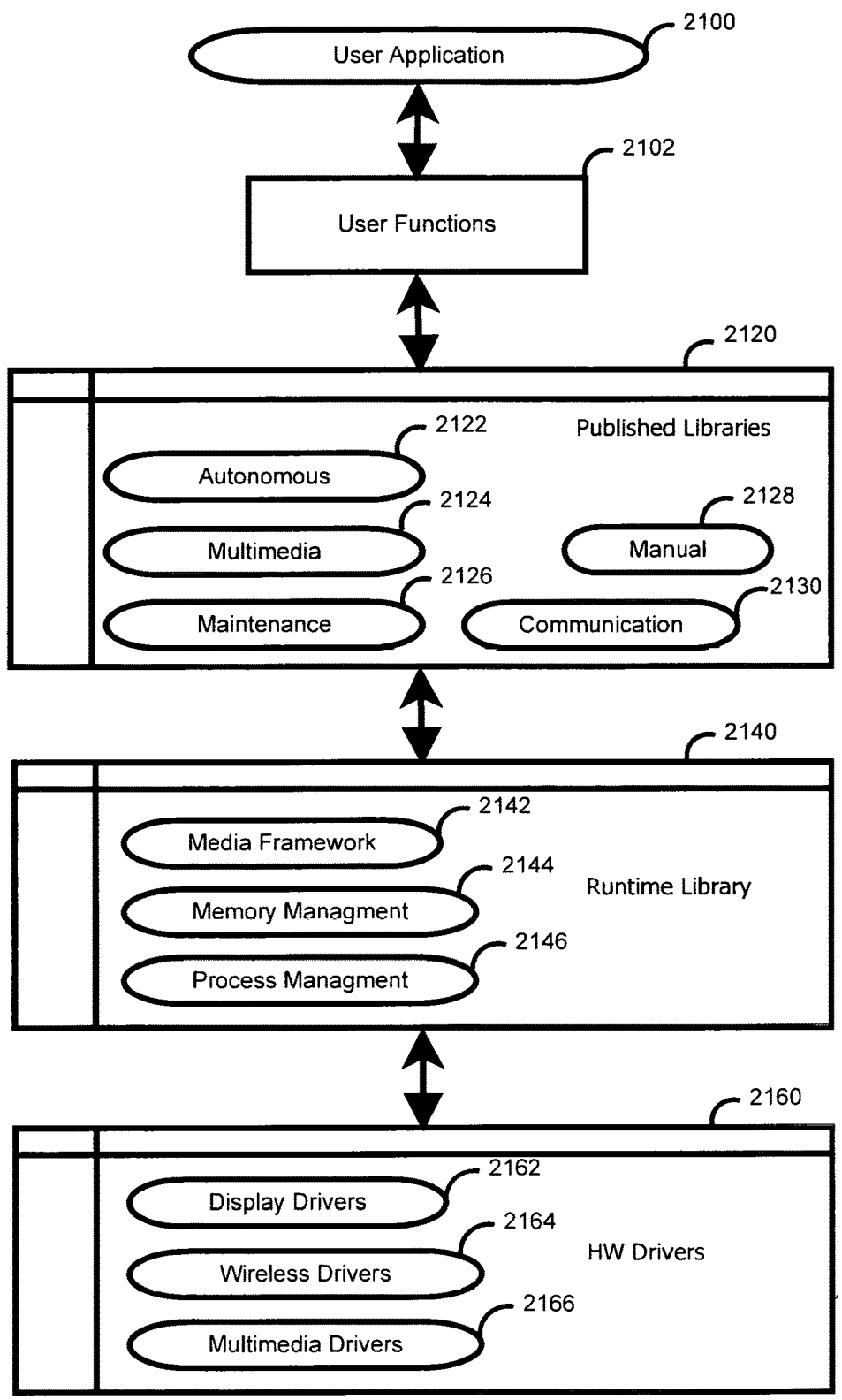
FIG. 20 is a detailed diagram of an Elevated Robotic Assistive Device Software Stack User Application in a software stack.

A diagram of an Elevated Robotic Assistive Device ERAD Software Stack is shown in FIG. 17, and may include, but is not limited to a development environment comprised of user applications 2100, published libraries 2120, runtime library 2140, and hardware drivers 2160. Alternatively, the software stack may be comprised of a monolithic application 1900, runtime library 2140, and hardware drivers 2160. An exemplary embodiment of a development environment with detailed diagram of a user application 2100 as it exists in the software stack is shown in FIG. 20. User functions, 2102, may include algorithms written by developers to control ERAD behavior, such as residential security monitoring, medical assistance or multimedia record and/or playback. User functions 2102 access published libraries (i.e. application programmer interfaces, APIs), 2120 which may include, but are not limited to, functions executed by an ERAD such as autonomous functions, 2122, to assist with automatic, stand-alone ERAD processing, multimedia functions, 2124 to assist with audio, video, and graphics processing, maintenance functions, 2126, to assist with diagnostic and other ERAD health processing, manual functions, 2128, to assist with user controlled processing, and communication functions, 2130, to assist with ERAD-ERAD, ERAD-wireless access point, or ERAD-CBS communication processing. Published libraries, 2120, on the software stack access a runtime library, 2140, which includes but is not limited to media framework, 2142 for access to audio or video playback engines, memory management, 2144, to allocate and deallocate memory for the applications, and process management, 2146, to manage and secure multiple tasks running simultaneously in a multi-tasking or multi-threaded environment. Runtime library, 2140, on the software stack accesses hardware drivers, 2160, which includes but is not limited to, display drivers, 2162, to setup and control display hardware, wireless drivers, 2164, to setup and control wireless hardware and protocols, and multimedia drivers, 2166, to setup and control audio, video, graphics and other multimedia based hardware.

Figure 18:
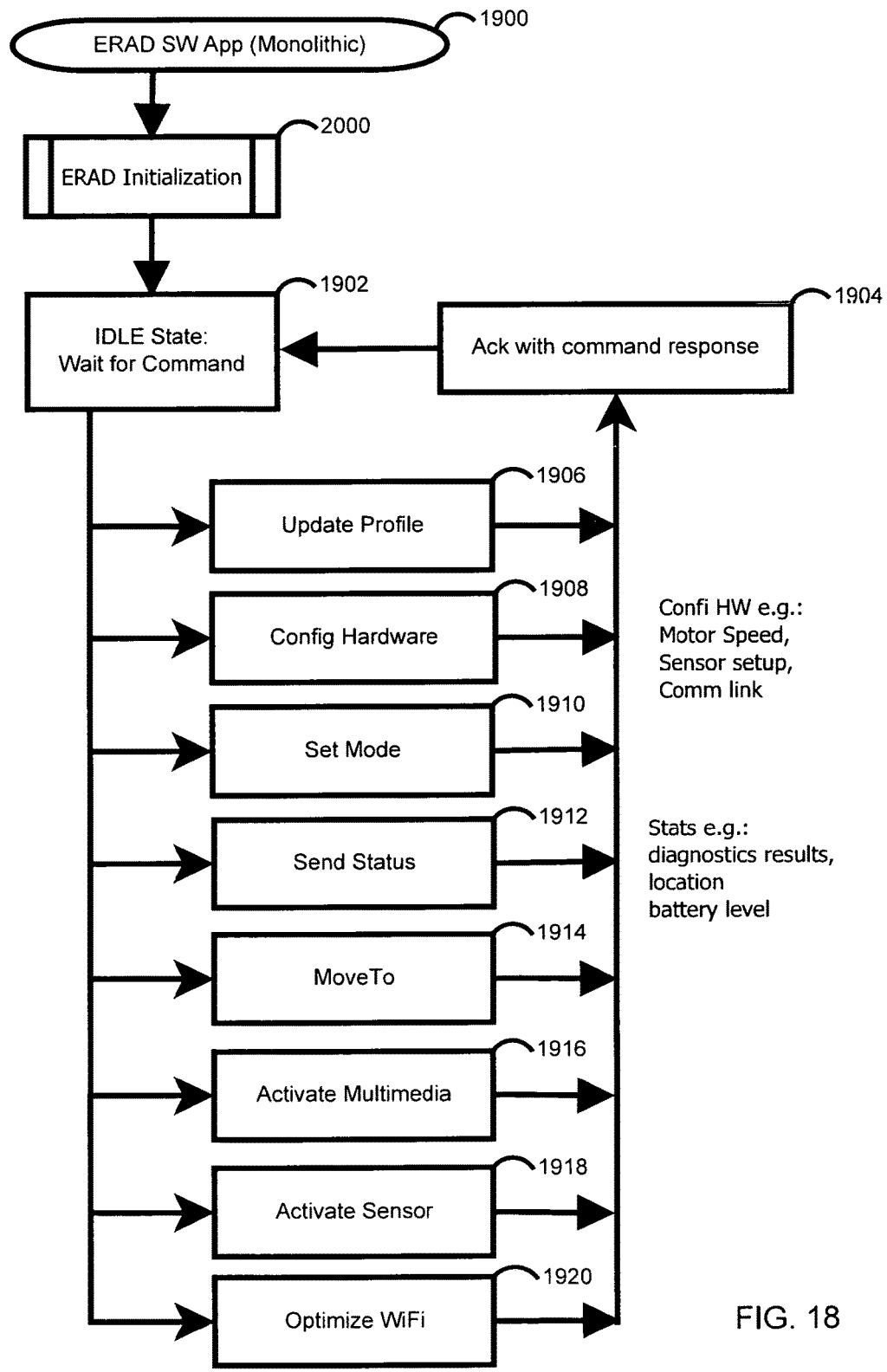
FIG. 18 is a detailed diagram of an Elevated Robotic Assistive Device Monolithic software application.
Figure 19:
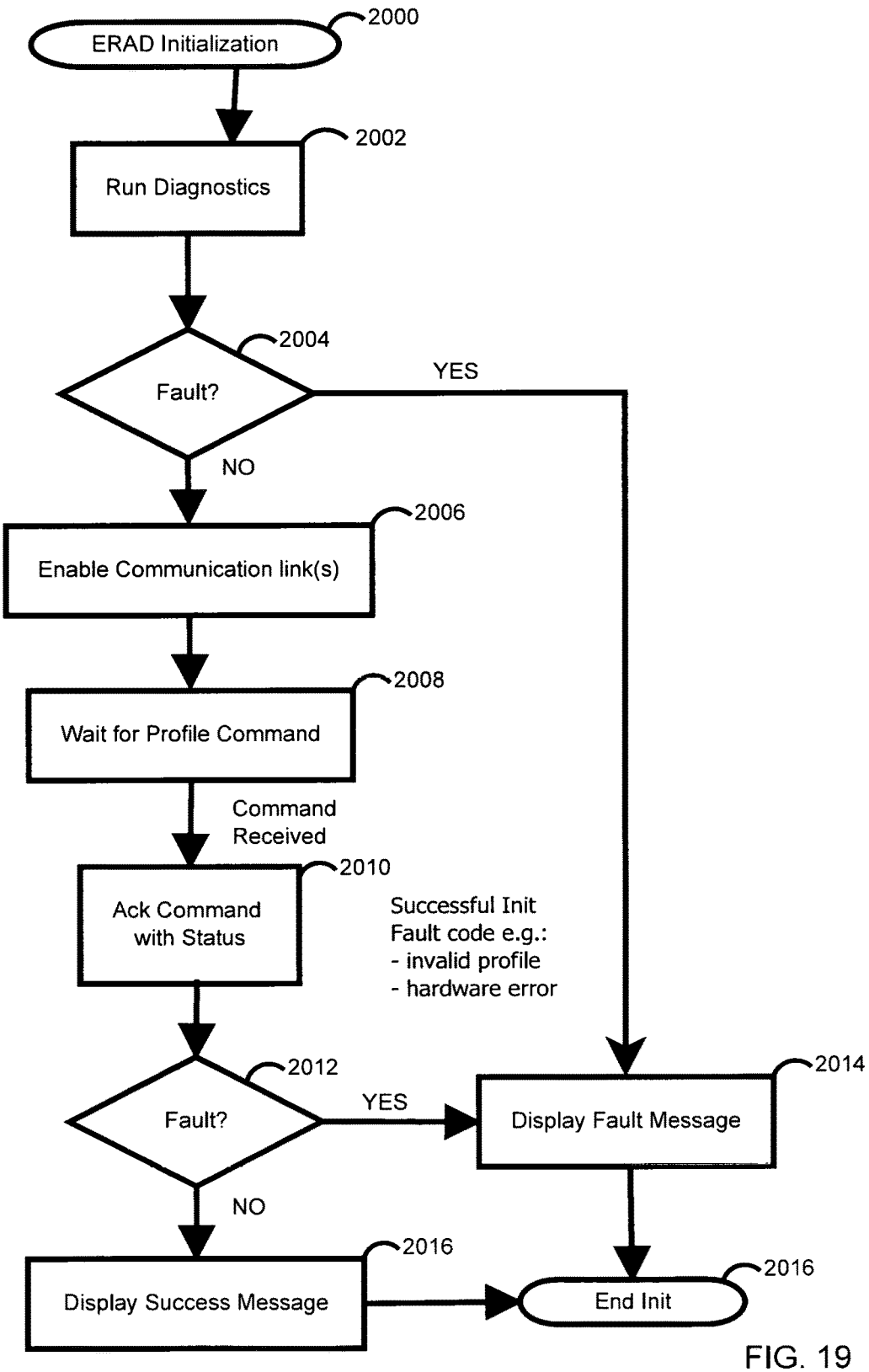
FIG. 19 is a flow diagram of an Elevated Robotic Assistive Device Initialization routine.

A detailed diagram of an Elevated Robotic Assistive Device ERAD Monolithic software application is shown in FIG. 18. Control is first passed to an initialization routine 2000 and is shown in detail in FIG. 19. The initialization routine 2000 may include, but is not limited to, running a diagnostics routine 2002. The diagnostics may be run on hardware and software. If an error or fault is detected 2004, the fault message is displayed on a local display or sent via communication link (e.g. wired or wireless) to a connected computer or base station controller, then control is passed back to the monolithic software application, where an idle state is entered 1902 and the application waits for a command. The wait may be implemented in software as an infinite loop checking for a message to be received or may be implemented as event driven based on receiving a hardware or software interrupt. If the application receives a command, the command is executed, then status and other data may be collected and sent back to the controller issuing the command along with an acknowledge message. In an exemplary embodiment, commands that may be issued by a controller and received, executed, and acknowledged by the monolithic software application may include, but are not limited to, updating the ERAD profile 1906 (e.g. setting up database entries), hardware configuration 1908 (e.g. setting motor speed, sensor setup, communication link setup), mode setup 1910 (e.g. manual or autonomous), send status 1912 (e.g. sending current health of hardware, position of ERAD, etc.), move to a position on the track 1914, activate multimedia 1916 (e.g. turn on audio record or playback, turn on video capture or playback), activate sensor 1918 (e.g. turn on a microphone, camera, etc.), optimize WiFi 1920 (e.g. as described herein and in FIG. 10 and FIG. 11).

Figure 8:
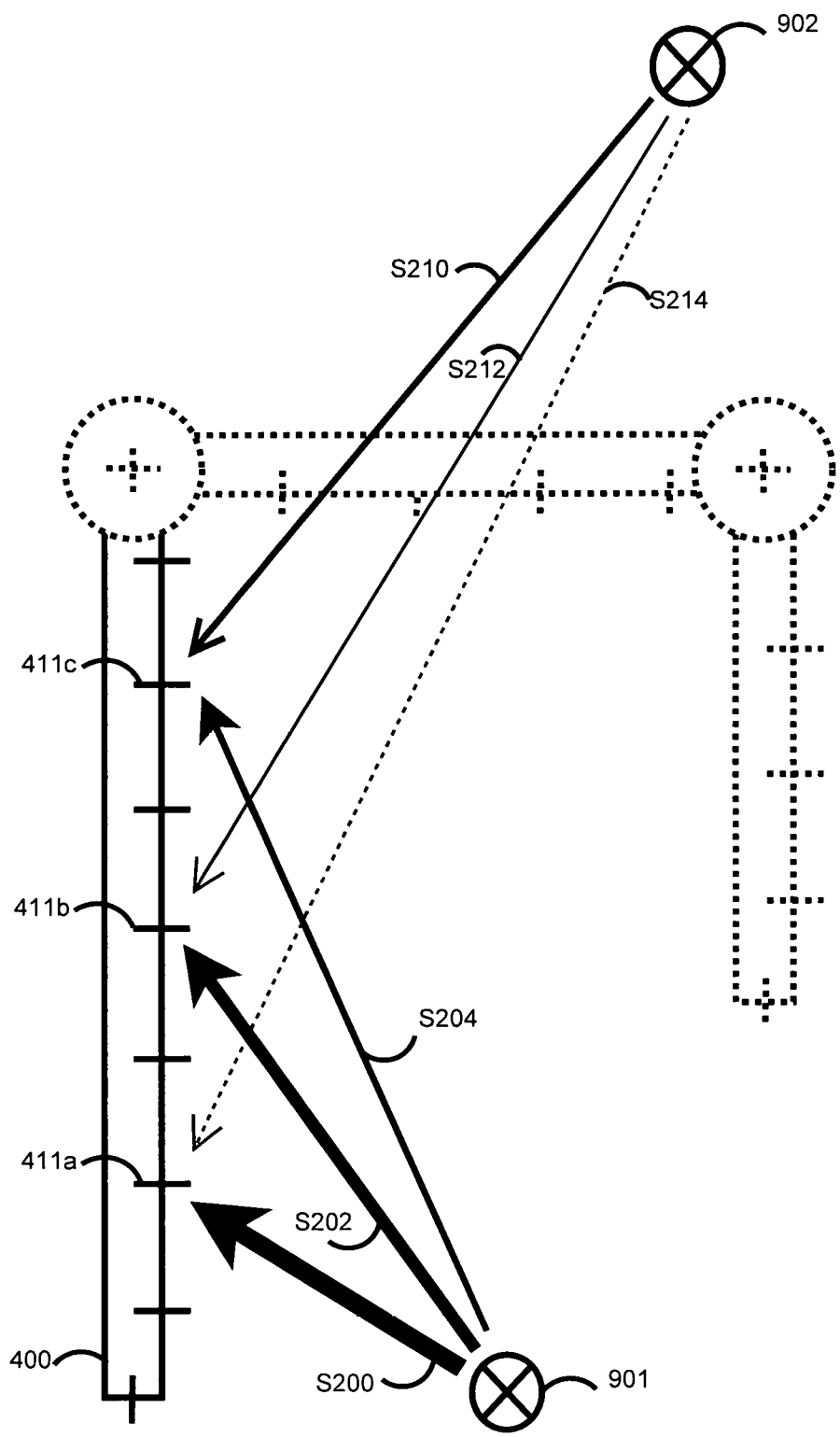
FIG. 8 is a diagram of an Elevated Robotic Assistive Device Track Map, example signal transceiver devices, and signal strength indications at various points on the track.

In an exemplary embodiment, the Elevated Robotic Assistive Device may be used to provide wireless service or determine optimal physical wireless receiver position between multiple transmitting devices in an environment. For example, an ERAD may be used as a mobile wireless access point (AP) such as WiFi, wherein the ERAD moves to an optimal physical point on the track in order to most efficiently service multiple users. An example diagram of multiple users of a transmitting source such as WiFi, 901, 902 in an environment (e.g. residence, coffee shop, book store, etc.) is shown in FIG. 8, wherein an AP is attached to an ERAD and travels either autonomously or manually along a portion of track 400 (i.e. along markers 411*a*, 411*b*, 411*c*). As shown in FIG. 8, the received signal strength by an AP attached to an ERAD positioned at each of the markers 411*a*, 411*b*, 411*c* on track 400 varies and is depicted by the varying width of the signal arrows. For example, if the AP is positioned at track marker 411*a*, the signal S200 received from user 901, is much stronger than the signal S214 of user 902 (i.e. S200 has a much thicker arrow than S214). Similarly, if the AP attached to an ERAD is positioned at track marker 411*c*, the signal S204 received from user 901 is comparable to the signal S210 received from user 902.

In some cases, the signal strength becomes too weak to support the required data rate for the application (e.g. on-line game or streaming video) or may drop the communication link altogether. In order to position the ERAD to provide adequate service to all users a controller may be used to manually move the ERAD to a position or an autonomous optimization algorithm may be implemented. Further, if a mobile AP (i.e. AP attached to an ERAD) is realized with an autonomous optimization algorithm and the optimum physical position is found on the track, the algorithm should be adaptable to detect if a user has moved, new users have begun to use the AP, or if a user has ceased using the AP.

Figure 10:
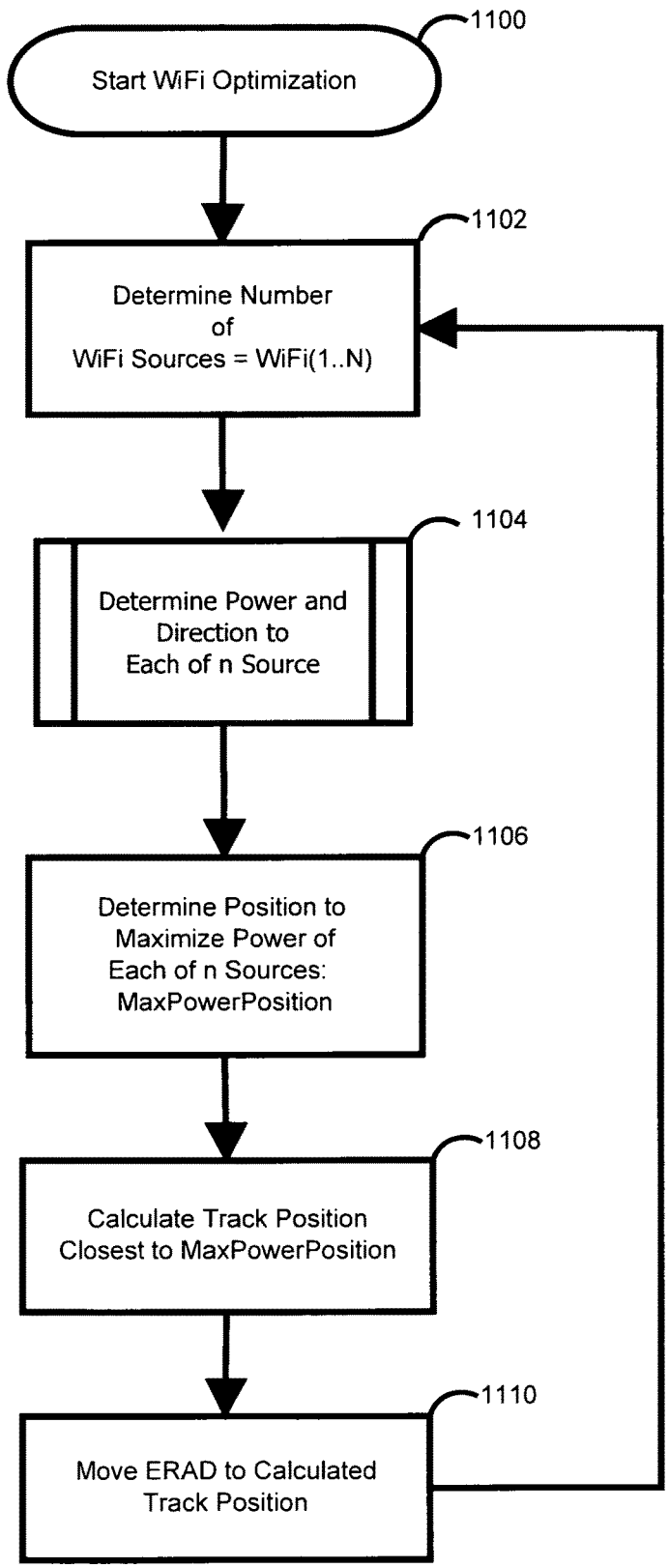
FIG. 10 is a flow diagram of an Elevated Robotic Assistive Device WiFi Optimization Algorithm.

An exemplary WiFi Optimization Algorithm 1100 for a mobile AP using an ERAD is shown in FIG. 10. The algorithm determines the number of WiFi sources 1102 (i.e. the number of users accessing the AP). Control is then passed to processing block 1104 which calculates the power of each of the WiFi sources as well as the direction to each source, and is shown in detail in FIG. 11. Once the power and direction is determined for each of the users, control passes to 1106 where the optimum position is determined that maximizes the power to each of the WiFi sources. Methods to determine the optimum position may include, but are not limited to, calculating the Euclidean distance, calculating the centroid (center of mass), or calculating the center of gravity in non-uniform fields. The optimum position determined in 1106 may not be physically possible to move to by the ERAD so a track position that is closest to the optimum position is calculated 1108.

Figure 11:
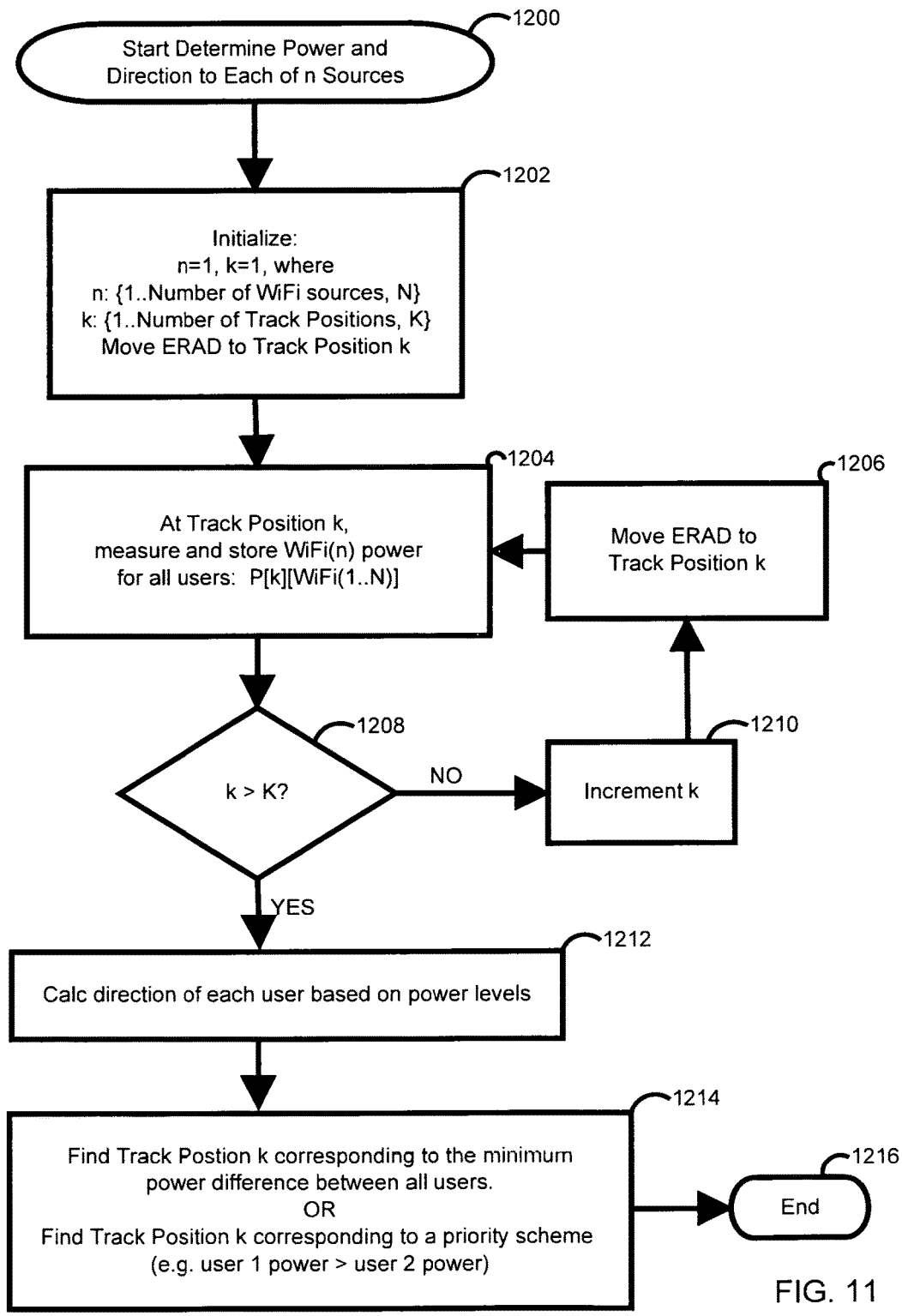
FIG. 11 is a flow diagram of an Elevated Robotic Assistive Device WiFi Optimization Power and Direction Determination Algorithm.

An exemplary embodiment of the processing for determining the power and direction of each of the WiFi sources 1104 is shown in FIG. 11. An initialization is performed 1202 wherein an identifier cycles through the number of WiFi sources, denoted by n where n ranges from 1 to the total number of WiFi sources N, and the number of track positions, denoted by k where k ranges from 1 to the max number of track positions K. The K positions may be all the positions identified by track markers as described herein, or may be a subset of the positions identified by the track markers (e.g. only the track positions in the hallway of a residence) as shown in FIG. 8. Track positions are stored in memory either on the ERAD directly or in a database on a wireless device, 355, or in the cloud, 910, as described herein. The ERAD is moved to position k and the received WiFi power for each user n (n={1 . . . N}) is measured and stored 1204 (i.e. the environment is surveyed). The process starting from 1204 is repeated for all track positions {1 . . . K} by incrementing k, and moving the ERAD to the updated position k, 1206, until the power of all users have been measured for each of the positions 1208. It should be understood that a single user power may be measured and stored for each track location k (k={1 . . . K}) before moving the ERAD back to the start position and repeating the process starting at 1204. Once all the track positions have been surveyed, processing in 1212 determines the direction of each of the users based on the power levels stored for each of the track positions. Note that the calculated direction may include an ambiguity along an axis perpendicular to the axis of the track, and can be resolved by apriori knowledge on usable space under the track (e.g. the ambiguous position may be inside a wall and not possible). Alternatively, processing in 1214 determines the position corresponding to the minimum power difference between the users, resulting in the position corresponding to the most uniformly distributed power among the users. In an exemplary embodiment, a priority scheme may be executed which distributes power to each of the users in a non-uniform fashion (e.g. user 1 is allocated 6 dB more power than user 2).

It should be understood that the WiFi optimization technique described herein may be applied to other fixed or mobile positioned wireless devices such as Bluetooth beacons, infra-red transceivers, or the like. The technique may also be applied to finding an optimum audio position (e.g. moving towards a user for the purpose of enhancing voice recognition accuracy). Further, the technique may also be applied to finding an optimum image position (e.g. moving towards a person, pet or landmark for the purpose of enhancing image recognition accuracy). Similar algorithmic methods as described herein (e.g. FIG. 8, FIG. 9A, FIG. 9B, FIG. 10, FIG. 11) can be used for such alternative wireless technologies.

Figure 9A:
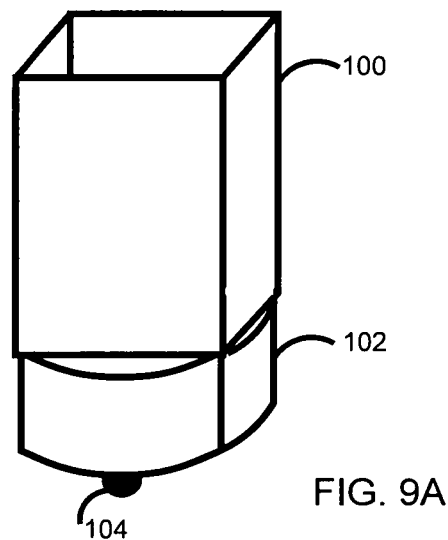
Figure 9B:
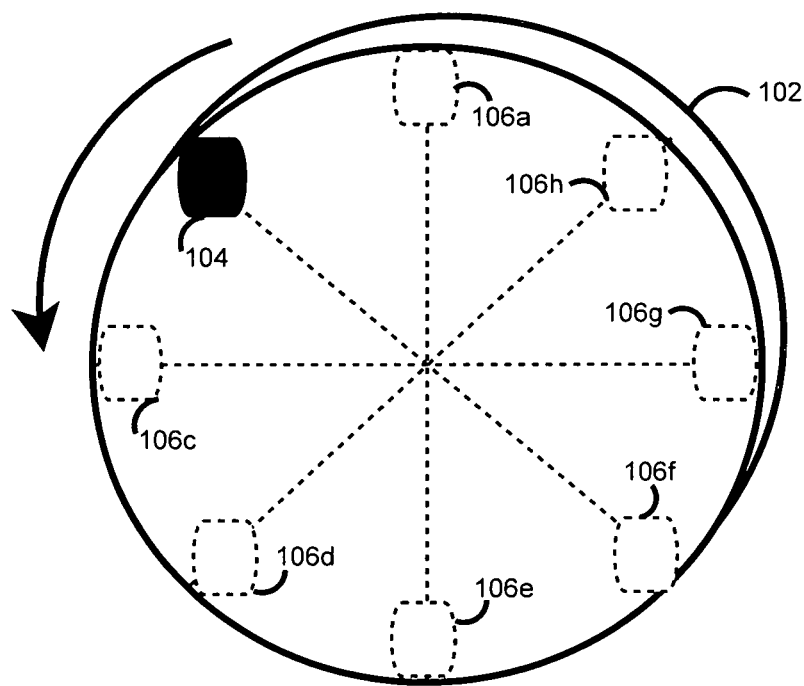
FIG. 9B is a diagram representing the underside of the rotating apparatus with one or more sensors attached to the underside and a plurality of angles identified on the underside.

A diagram of a rotating sensor module attached to an ERAD is shown in FIG. 9A with a detailed diagram of the underside of the module shown in FIG. 9B. An alternate signal strength determination method to that which is described herein may utilize a configuration shown in FIG. 9A and FIG. 9B, which allows for determining the direction of motion of a moving object without the need for the ERAD to traverse track 400. In the alternate apparatus and method, the controller hardware on the ERAD is actuated to rotate the sensor module, wherein one or more sensors is mounted on the module. A processor measures the signal strength at fixed angles along the rotation to produce a plurality of signal strength measurements. The processor determines the direction to the object by comparing the signal strength measurements, and subsequently determines the motion of the object by repeating the determination of direction over several time epochs. For example, if the sensor 104 was an audio directional microphone, the processor actuates hardware to rotate the microphone and measures the received signal at periodic angles comprising the current position at 104 and subsequent positions along the rotation at 106a, 106c, 106d, 106e, 106f, 106g, and 106h. In the example, if the object was positioned along a vector originating from the center of the rotating module (i.e. the center of the circle in FIG. 9B) and extending through the position at 104 then the expected signal level read from the sensor would be highest at the position at 104 and the expected levels at positions 106a and 106c would be comparable but slightly less than that at position 104. Similarly, the expected signal levels at positions 106d and 106h would be comparable and slightly less than positions 106a and 106c, and so on. The determination of decreasing signal levels at the positions would allow for centering a vector in the direction of the object by originating the vector at the center of the rotating module (i.e. the center of the circle in FIG. 9B), extending through the position at the highest measured signal level, and adjusting the angle so that levels between the two adjacent positions are comparable. In a similar example, if the sensor 104 was a WiFi antenna, the processor actuates hardware to rotate the antenna and measures the received radio signal at the positions along the rotation and determines the direction of the signal source using the technique described herein.

In an alternate embodiment to the rotating sensor module described herein, the sensor module is attached to control device holder 300 to provide rotation along a pitch and yaw axis. This provides a more precise positioning of the sensors than if the module was attached to housing 100.

In an alternate embodiment using the rotating sensor module described herein, the sensor module is not rotated, but instead held in a fixed position and comprises a plurality of sensors mounted at the specific angles identified at 106a-106h in FIG. 9B. In this embodiment, instead of rotating the sensor module and taking measurements with the single attached sensor, the measurements are taken from each of the plurality of mounted sensors in a fixed sequence around the sensor module. The algorithm to determine the signal strength and direction may then be identical to that described herein.

Figure 21:
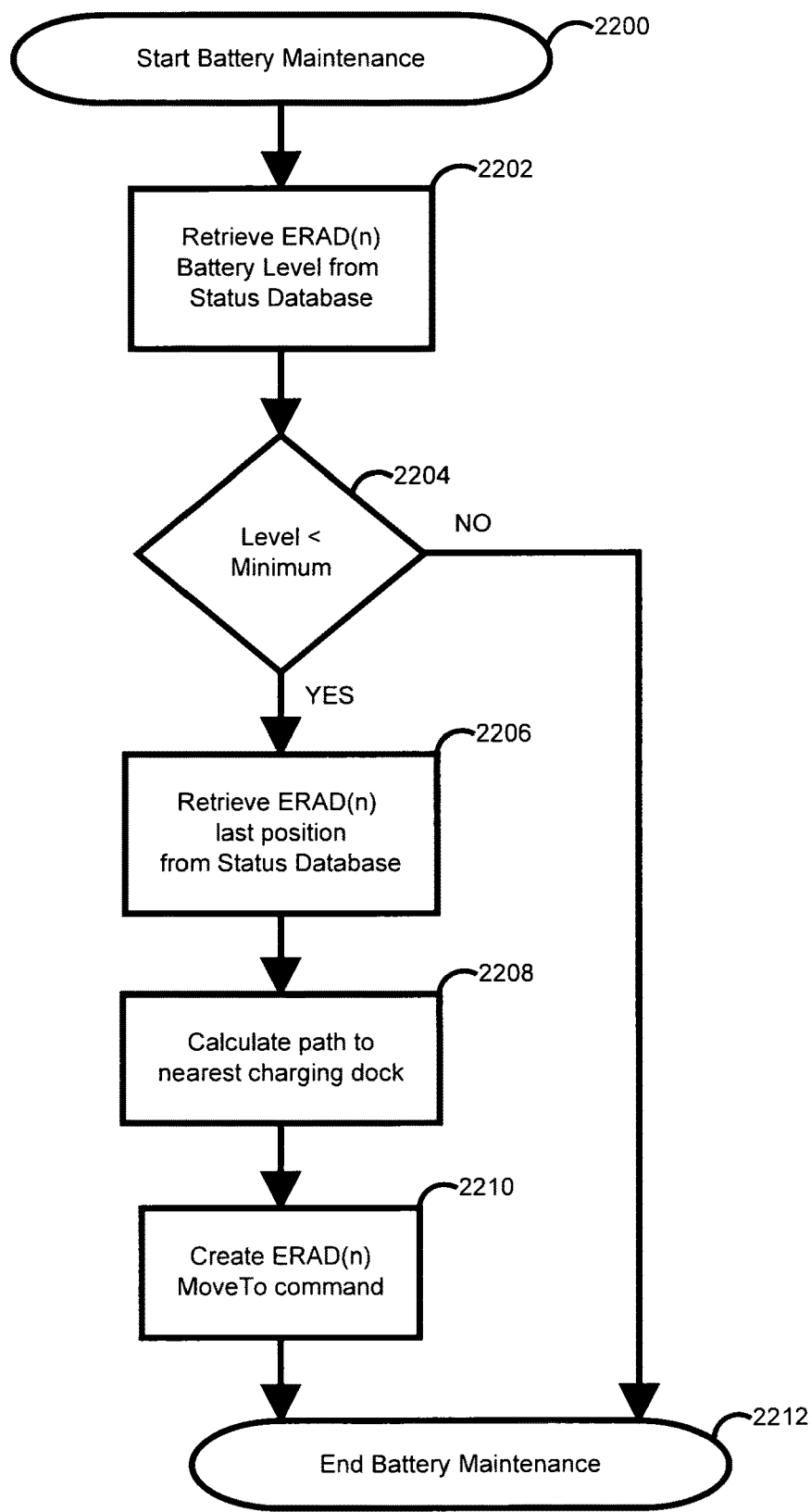
FIG. 21 is a flow diagram of an Elevated Robotic Assistive Device Base Station battery maintenance algorithm.

A flow diagram of an ERAD Base Station battery maintenance algorithm is shown in FIG. 21. The battery maintenance algorithm may be run on an ERAD 100 directly as part of an autonomous maintenance routine or may be controlled via wireless device 355 running a CBS software app 1000. The ERAD battery level is retrieved from either local storage on the ERAD 100 or from a database existing in local storage, 360, on the wireless device 355, or in the cloud 910. The battery level is checked against a minimum threshold 2204. If the battery level is greater than the minimum threshold then the maintenance routine is terminated 2212. If the battery level is less than the minimum threshold, then the route along track 400 is determined such that ERAD 100 may move to the battery charging station. The current or last known position of ERAD 100 is retrieved from local storage or database 2206. The known position on track 400 of the battery charging station is then used to calculate the route from the ERAD's current position to the charging station. The ERAD then moves to the charging station, 2210, either on its own in an autonomous mode, or via MoveTo command, 1914 issued by a CBS software app 1000.

The electronic and algorithmic techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), integrated or stand-alone graphics processing units (GPUs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, tablet, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the sprit or scope of the invention. Thus, the present invention is not intended to be limited to the embodiments shown herein but is to be accorded the widest scope consistent with the principles and novel features disclosed herein.

What is claimed is:

1. An elevated robotic assistance apparatus comprising:
   a track system comprising a track, rail, or track support frame which is elevated off the ground;
   a plurality of brackets to attach the track system to a support structure;
   a track switcher apparatus attached to the support structure and positioned adjacent to the track system, wherein the track switcher comprises a segment of track, rail or track support frame attached to a rotating disk and rotates to align with two or more of the tracks; and
   one or more motorized robotic apparatus attached to the track system.

2. The apparatus of claim 1, wherein the robotic apparatus is powered by rechargeable batteries.

3. The apparatus of claim 1, wherein the robotic apparatus is powered by power lines attached to the track system.

4. The apparatus of claim 2, wherein the track system further comprises a battery charging apparatus attached to track system for docking and charging the robotic apparatus.

5. The apparatus of claim 1, wherein the robotic apparatus comprises a plurality of attachable modules, wherein the attachable modules comprises one or more of controller electronics, actuators, and sensors.

6. The apparatus of claim 5, wherein the attachable module further comprises a track inspection and cleaning apparatus.

7. The apparatus of claim 5, wherein the attachable module further comprises one or more of motor, winch, mounting hook, visual pan mount, visual swivel mount, smart device, electronic processing unit, camera, microphone, audio speaker, and wireless router.

* * * * *